(12) United States Patent
Chen et al.

(10) Patent No.: US 10,997,779 B2
(45) Date of Patent: May 4, 2021

(54) METHOD OF GENERATING AN IMAGE FILE OF A 3D BODY MODEL OF A USER WEARING A GARMENT

(71) Applicant: METAIL LIMITED, London (GB)

(72) Inventors: Yu Chen, London (GB); Sukrit Shankar, London (GB); Dongjoe Shin, London (GB); David Chalmers, London (GB); Jim Downing, London (GB); Tom Adeyoola, London (GB)

(73) Assignee: METAIL LIMITED, London (GB)

( * ) Notice: Subject to any disclaimer, the term of this patent is extended or adjusted under 35 U.S.C. 154(b) by 0 days.

(21) Appl. No.: 16/488,788

(22) PCT Filed: Feb. 27, 2018

(86) PCT No.: PCT/GB2018/050496
§ 371 (c)(1),
(2) Date: Aug. 26, 2019

(87) PCT Pub. No.: WO2018/154331
PCT Pub. Date: Aug. 30, 2018

(65) Prior Publication Data
US 2020/0066029 A1 Feb. 27, 2020

(30) Foreign Application Priority Data

Feb. 27, 2017 (GB) ...................... 1703129

(51) Int. Cl.
*G06T 15/20* (2011.01)
*G06T 7/11* (2017.01)
(Continued)

(52) U.S. Cl.
CPC .............. *G06T 15/205* (2013.01); *G06T 7/11* (2017.01); *G06T 7/70* (2017.01); *G06T 15/04* (2013.01);
(Continued)

(58) Field of Classification Search
None
See application file for complete search history.

(56) References Cited

U.S. PATENT DOCUMENTS

2015/0134493 A1* 5/2015 Su ..................... G06T 15/005
705/27.2

FOREIGN PATENT DOCUMENTS

EP 1 959 394 A2 8/2008

OTHER PUBLICATIONS

Yang et al. ("Detailed Garment Recovery from a Single-View Image;" publication at: https://www.researchgate.net/publication/305809442—Aug. 2016 (Year: 2016).*

(Continued)

*Primary Examiner* — Edward Martello
(74) *Attorney, Agent, or Firm* — Saul Ewing Arnstein & Lehr LLP

(57) ABSTRACT

A computer-implemented method of generating an image file of a 3D body model of a user wearing a garment, comprising: (i) receiving one or more two dimensional images of a model wearing a garment, which images provide a view of an outer surface of the garment; (ii) for each two dimensional image, segmenting an image of the garment to produce a set of segmented garment images; (iii) using the set of segmented garment images to generate a complete 3D garment model; (iv) receiving a 3D body model of a user; (v) simulating the complete 3D garment model worn on the 3D body model of the user and, (vi) generating an image file of the 3D body model of the user wearing the complete 3D garment model, using the simulated complete 3D garment model worn on the 3D body model of the user.

21 Claims, 18 Drawing Sheets

(51) Int. Cl.
*G06T 7/70* (2017.01)
*G06T 15/04* (2011.01)
*G06T 17/00* (2006.01)
*G06T 19/20* (2011.01)

(52) U.S. Cl.
CPC .............. *G06T 17/00* (2013.01); *G06T 19/20* (2013.01); *G06T 2200/24* (2013.01); *G06T 2207/20084* (2013.01); *G06T 2207/30196* (2013.01); *G06T 2210/16* (2013.01); *G06T 2219/2004* (2013.01)

(56) References Cited

OTHER PUBLICATIONS

Furukawa et al., "3D clothes modeling from photo cloned human body," Virtual Worlds, Second Intl. Conf. VW 2000 Proceedings, pp. 159-170 (Jul. 5, 2000) Retrieved from the Internet: URL:http://www.miralab.ch/repository/papers/26.pdf [retrieved on Jun. 13, 2012] XP055029719.
Li et al., "3D Fashion Fast Modeling from Photographs," Computer Science and Information Engineering, 2009 WRI World Congress on, IEEE, Piscataway, NJ pp. 738-742 (Mar. 31, 2009) XP031494711.
International Search Report, dated Oct. 7, 2018, issued in international Application No. PCT/EP2018/050496.

* cited by examiner

METHOD OF GENERATING AN IMAGE FILE OF A 3D BODY MODEL OF A USER WEARING A GARMENT

CROSS REFERENCE TO RELATED APPLICATIONS

This application claims the priority of PCT/GB2018/050496, filed on Feb. 27, 2018, which claims priority to GB Application No. GB1703129.5, filed Feb. 27, 2017, the entire contents of each of which being fully incorporated herein by reference.

TECHNICAL FIELD

The present disclosure relates to methods of generating an image file of a 3D body model of a user wearing a garment, and to related systems and computer program products. The present disclosure further relates to production systems for producing garments via use of interactive garment models. Moreover, the present disclosure relates to methods of using aforementioned production system for producing garments via use of interactive garment models. Furthermore, the present disclosure relates to computer program products comprising a non-transitory computer-readable storage medium having computer-readable instructions stored thereon, the computer-readable instructions being executable by a computerized device comprising data processing hardware to execute aforesaid methods.

BACKGROUND

In recent past years, online apparel sales have become popular Worldwide. However, customers have often returned apparel products, for example, in an event that a given customer has found that an apparel product does not fit him or her, or in an event that the given customer has found that the apparel is not aesthetically acceptable to him or her. Such product returns lead to significant loss of resources for a retailer of such apparel. Furthermore, the product returns require involvement of multiple teams, including administration staff, customer relations staff, and delivery staff, as well as equipment.

Accordingly, many online stores provide a virtual try-on facility that allow customers to be provided with more information about how a given garment may look when the customers wear the given garment. Known virtual try-on facilities are valuable to shoppers. Furthermore, the facilities reduce returns and increase conversion, namely revenue, for the retailer.

However, existing known virtual try-on facilities in the market suffer from some technical constraints which pose a hindrance to their faster scaling and adoption. The constraints relate to creating digital garment models usable for virtual fitting, as the constraints require the retailer (or a retailer partner) to provide real garment samples, which incurs logistic costs and limits a range of "try-on-able" garments available via the Internet. Furthermore, the constraints relate to a requirement of a photography rig, because there is involved a considerable initial capital cost from a given retailer (or a retailer partner). Furthermore, the constraints relate to an integration process involving ramifications to partners' existing operation pipelines. Moreover, current contemporary digitisation costs still remain a concern to smaller retailers interested in providing virtual try-on facilities, for example as aforementioned.

Therefore, in light of the foregoing discussion, there exists a need to address, for example to overcome, the aforementioned drawbacks including a high cost of garment digitization, a slow speed of garment digitization and limitations with respect to scalability of garment digitization.

SUMMARY OF THE INVENTION

There is provided a computer-implemented method of generating an image file of a 3D body model of a user wearing a garment, the method comprising the steps of:
(i) receiving one or more two dimensional images of a model wearing a garment, wherein the one or more two dimensional images of the model wearing the garment provide a view of an outer surface of the garment;
(ii) for each two dimensional image, segmenting an image of the garment to produce a set of segmented garment images;
(iii) using the set of segmented garment images to generate a complete 3D garment model;
(iv) receiving a 3D body model of a user;
(v) simulating the complete 3D garment model worn on the 3D body model of the user and,
(vi) generating an image file of the 3D body model of the user wearing the complete 3D garment model, using the simulated complete 3D garment model worn on the 3D body model of the user.

The method may be one wherein the view of an outer surface of the garment is an incomplete view of an outer surface of the garment, and wherein step (iii) includes filling-in a 3D garment model to generate the complete 3D garment model. An advantage is that starting with an incomplete view of an outer surface of the garment, a complete 3D garment model can nevertheless be obtained.

The method may be one including: deriving a set of texture samples of the garment from the set of segmented garment images; using the set of segmented garment images to generate an incomplete 3D garment model; filling-in the incomplete 3D garment model to generate a complete 3D garment model, including filling-in a texture of the complete 3D garment model using the texture samples, to create a coherent texture of the complete 3D garment model, the complete 3D garment model including the coherent texture of the complete 3D garment model.

An advantage is that starting with an incomplete view of an outer surface of the garment, a complete 3D garment model can nevertheless be obtained. A further advantage is that an image file can be generated of a user wearing the garment, in which only an incomplete view of an outer surface of the garment was available.

The method may be one wherein for each two dimensional image, the segmenting of an image of the garment to produce a segmented garment image is performed automatically.

The method may be one in which any occluded sections of the garment within the one or more two dimensional images of the model wearing the garment are identified and recreated automatically to produce a non-occluded 3D garment model.

The method may be one in which at least one of a patch based algorithm, and a diffusion based algorithm, is used.

The method may be one including predicting automatically a visibility of and locations of one or more garment landmarks and/or splines on the model within an image.

The method may be one including acquiring a plurality of model images of the model where one or a plurality of viewing angles and one or a plurality of body poses, are used.

The method may be one including predicting automatically body parameters or measurements of the model.

The method may be one including rendering the body parameters or measurements selectable from height, weight, bust, waist, hips.

The method may be one including using a deep neural network model for generating the 3D garment model, or for generating the complete 3D garment model.

The method may be one including acquiring the one or more two dimensional images of the model wearing the garment from at least one of: an internet web site, a digital camera device, a computer aided design, a streaming data feed.

The method may be one including using a data processing arrangement comprising a first subsystem which creates a digital garment model of a garment from 2D images of the garment, and a second subsystem which simulates the digital garment model onto a 3D body avatar of a consumer.

The method may be one including using the first subsystem to store one or more digital garment models in a garment database.

The method may be one including using the first subsystem to store selectively one or more of the following in the garment database: image data, unsegmented original garment images, segmented garment sprites in different pose, camera views, metadata data, control points, splines positions, semantic labels, style attributes, colour attributes, texture attributes, shape attributes, fit styles attributes, vertical drapes attributes, cuff, hem height, waist line position, material stretch attributes, material strain attributes.

The method may be one including using the data processing arrangement to receive inputs from the user, wherein the inputs include one or more consumer body metrics, and using the second subsystem to generate automatically a 3D body avatar representing the consumer's body shape.

The method may be one including using the data processing arrangement to render the user's body metrics selectable from height, weight, cup size, bust circumference, waist circumference, hips circumference, inside leg length.

The method may be one including using the second subsystem to create the 3D body avatar representing the user's body shape using a 3D statistical body model with an embedded skeleton and a regression application.

The method may be one including using the data processing system to receive inputs from the user to define a preferred body pose, and to configure the second subsystem to create automatically an identical body pose for the 3D body avatar.

The method may be one including using the second subsystem to select automatically one or more digital garment models from a garment database which match a consumer's garment choice input.

The method may be one including the data processing arrangement providing a user interface (UI) for the user to use to input data.

The method may be one including using the second subsystem to simulate automatically a drape and a fit of the digital garment model onto the 3D body avatar.

The method may be one including using the second subsystem to simulate the drape and the fit of the digital garment model onto the 3D body avatar using finite-element analysis.

The method may be one including using the second subsystem to composite automatically multiple individual garment models in a correct layering order and then to display the 3D body avatar in an outfit of one or more selected garments.

The method may be one including the step of the second subsystem automatically selecting one or more body poses for visualization for a given camera view based on one or more digitisation poses stored in the garment database.

The method may be one including the step of the first subsystem recognizing body poses in the one or more two dimensional images of the model wearing the garment, and automatically matching a nearest pose in a pre-defined pose pool and selecting appropriate body poses for digitization.

The method may be one including generating the complete 3D garment model to comprise one or more of: garment geometry information, a 2D silhouette, a 3D mesh model, garment appearance information, cut-out garment texture sprites, texture maps for a 3D mesh, alpha maps, garment metadata information, landmark points, control splines, garment style attributes, garment colour attributes, garment texture attributes, garment shape attributes, garment fit styles attributes, garment vertical drape attributes, a garment cuff, a garment hem height, a garment waist line position, a garment material stretch, garment strain attributes.

According to a second aspect of the invention, there is provided a system arranged to generate an image file of a 3D body model of a user wearing a garment, the system including a processor configured to:

(i) receive one or more two dimensional images of a model wearing a garment, wherein the one or more two dimensional images of the model wearing the garment provide a view of an outer surface of the garment;

(ii) for each two dimensional image, segment an image of the garment to produce a set of segmented garment images;

(iii) use the set of segmented garment images to generate a complete 3D garment model;

(iv) receive a 3D body model of a user;

(v) simulate the complete 3D garment model being worn on the 3D body model of the user and, (vi) generate an image file of the 3D body model of the user wearing the complete 3D garment model, using the simulated complete 3D garment model being worn on the 3D body model of the user.

The system may be one in which the processor includes a first subsystem including a first processor configured to create a digital garment model of a garment from 2D images of the garment, and a second subsystem including a second processor configured to simulate the digital garment model onto a 3D body avatar of a consumer.

The system may be further configured to perform a method of any aspect of the first aspect of the invention.

According to a third aspect of the invention, there is provided a computer program product, executable on a processor to perform a method of generating an image file of a 3D body model of a user wearing a garment, the computer program product executable on the processor to:

(i) receive one or more two dimensional images of a model wearing a garment, wherein the one or more two dimensional images of the model wearing the garment provide a view of an outer surface of the garment;

(ii) for each two dimensional image, segment an image of the garment to produce a set of segmented garment images;

(iii) use the set of segmented garment images to generate a complete 3D garment model;

(iv) receive a 3D body model of a user;

(v) simulate the complete 3D garment model worn on the 3D body model of the user and, (vi) generate an image file of the 3D body model of the user wearing the complete 3D garment model, using the simulated complete 3D garment model worn on the 3D body model of the user.

The computer program product may be further executable on the processor to perform a method of any aspect according to the first aspect of the invention.

Further aspects of the invention are recited in the Claims.

SUMMARY OF FURTHER ASPECTS

The present disclosure seeks to provide a production system for producing a garment via use of an interactive garment model created from one or more two dimensional images. The production system includes a data processing arrangement which executes one or more software products to create an interactive environment for hosting the interactive garment model. The two dimensional images may comprise at least a garment, a model wearing the garment and a background, by way of content. Furthermore, the production system may acquire the one or more two dimensional images of a garment from one or more viewing angles and create a three dimensional model of the garment.

Furthermore, the present disclosure seeks to provide a method of using a production system to design or produce a garment. The method includes using a data processing arrangement of the production system to execute one or more software products to create an interactive environment for hosting the interactive garment model. Furthermore, the method may include arranging for the two dimensional images to comprise at least a garment, a model wearing the garment and a background. Yet further, the method may include using the production system to acquire the one or more two dimensional images of a garment from one or more viewing angles. Moreover, the method may include using the production system to create a three dimensional model of the garment.

Embodiments of the present disclosure substantially eliminate, or at least partially address, the aforementioned problems in the prior art, and enable fully-automated and near-zero-cost garment digitization using the state-of-the-art computer vision and deep learning technologies.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summaries above, as well as the following detailed description of illustrative embodiments, may be better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1:
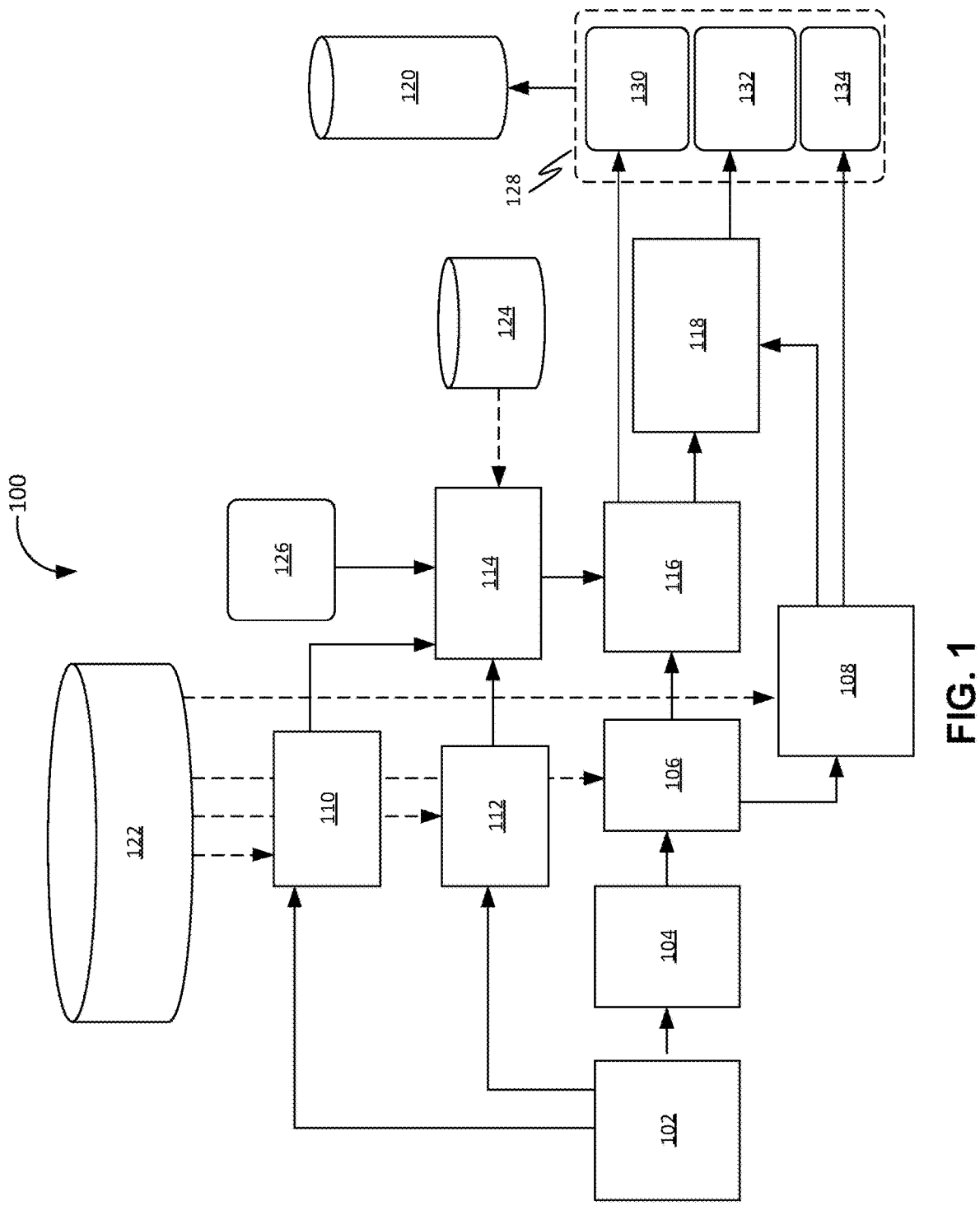
FIG. 1 is a block diagram of the HD garment digitisation subsystem, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, a production system for producing a garment via use of an interactive garment model created from one or more two dimensional images is disclosed. The one or more two dimensional images may include e-commerce product photos on retailer websites, existing mannequin or model photography from retailers, and images of dressed person(s) obtained from the Internet. The garment may include all clothing, accessories and footwear that might be worn or carried by a consumer. Furthermore, the garment images may be in distinct camera views or distinct body poses.

Furthermore, the production system includes a data processing arrangement which executes one or more software products to create an interactive environment for hosting the interactive garment model. The two dimensional images may include content comprising at least a garment, a model wearing the garment and a background. Furthermore, the production system may acquire the one or more two dimensional images of a garment from one or more viewing angles and creates a three dimensional model of the garment.

In some embodiments, the data processing arrangement for producing a garment may include two subsystems. The first subsystem may be a high definition (HD) subsystem for creating interactive garment models which are usable for virtual try-on and outfitting from 2D images of garment Stock Keeping Units (SKUs) and storing them into a garment database. The second subsystem may be a run-time subsystem for creating a customer's 3D body model, loading stored digital garment models from the garment database, simulating digital garment models on customer's body shape/pose, compositing different digital garment models into an outfit, and rendering a dressed avatar of the customer for final visualization. Therefore, the second subsystem simulates the interactive garment model onto a 3D body avatar of a consumer.

Furthermore, the HD garment digitisation subsystem may include one or more of API's ("application programmable interface") and UI's ("user interface") for garment photo uploading, a garment texture in-painting module, a garment cut-out and layer dividing module, a landmark and control spline prediction module, a model body pose prediction module, a camera view classification module, a body pose matching and pose changing module, a garment sprite alignment module, a garment geometry and physics reconstruction module, a garment database and a labelled garment image dataset, a standard reference avatar and a body pose pool.

Accordingly, the API's and UI's for garment photo uploading may allow API users (such as owners of a mini shop on the Amazon™ or eBay™), to upload their own product photos in distinct views to create interactive garment models suitable for online virtual try-on.

In an embodiment, the data processing arrangement segments automatically the garment from the model and the background. In some embodiments, the garment cut-out and layer dividing module may be used to automatically segment the garment (the foreground) from the model (the body) and the rest of background in a garment product photo especially when additional segmentation-assisting photography hardware (see for example D. Robertson: "*System and method for image processing and generating a body model*", September 2010; U.S. patent application Ser. No. 12/881,861) is not available. The garment cut-out and layer dividing module may perform semantic segmentation of garment product photo using a deep neural network implemented using DeepLab [e.g. L. Chen, G. Papandreou, L. Kokkinos, K. Murphy, and A. L. Yuille, "*DeepLab: Semantic Image Segmentation with Deep Convolutional Nets, Atrous Convolution, and Fully Connected CRFs*", arXiv preprint, 2016].

In a further embodiment, the data processing arrangement automatically identifies and recreates any occluded sections of the garment within the two dimensional image to produce a non-occluded garment. Accordingly, in some embodiments, the garment texture in-painting module may be used to semi-automatically complete any occluded garment texture (or occluded sections) in a product photo using an interactive UI. The occluded textures may result due to occluding hair or arms of the model. Accordingly, the garment texture in-painting module may fill up the occluded texture either by cloning the texture samples or by interpolating the colours from neighbouring unoccluded areas. A goal of such a method is to generate an overall visually plausible and coherent texture of the whole garment.

In a yet further embodiment, the data processing arrangement uses at least one of: a patch based algorithm (e.g. A. Criminisi, P. Perez and K. Toyama, "*Region Filling and Object Removal by Exemplar-Based Image Inpainting*", IEEE TRANSACTIONS ON IMAGE PROCESSING, Vol. 13, No. 9, September 2004), a diffusion based algorithm. The patch based algorithms may fill up the target area by cloning texture patch samples from unoccluded regions under certain constraints of filling priority, such as distance to the boundary, or gradient consistency. The patch based algorithms may be used for handling repetitive patterns or random patterns.

The diffusion-based algorithms may be used for handling uniform-coloured patterns with gradual shading variations. An example approach is harmonic interpolation, which assumes that there is a smooth/continuous colour function, i.e. f(x,y) and that the values at the boundary are known. The smoothness may be represented as a second order partial differential equations (PDE), shown in equation 1 below.

$$\nabla^2 f(x,y)=0, \partial\Omega=I(x,y), \quad (1)$$

wherein, $\partial\Omega$ represents a boundary of an occluded portion, $\Omega$ represents an occluded portion.

By solving the equation 1, the target region may be filled up by propagating colour smoothly from the boundary to the inside.

In order to support visualizing digital garment models on different body shape and body poses in for virtual try-on, complete garment texture is necessary, in an example.

In a further aspect, the data processing arrangement automatically predicts a visibility of and locations of one or more garment landmarks and/or splines on the model within the image. Moreover, the data processing arrangement further acquires a plurality of model images of the model from a plurality of viewing angles and in a plurality of body poses.

In some embodiments, the landmark and control spline prediction module may be configured to localise the landmarks characterising key positions on a garment. For example, the landmarks may correspond to the corners of the garment, positions of the armpit, etc. Further, the landmark and control spline prediction module may be configured to predict control splines (e.g. in the form of Bezier splines) which may be used to indicate the layer orders of garments in an outfit. This module is important for initializing finite-element garment physics simulation.

In further embodiments, the landmark and control spline prediction module may be implemented based on using a multi-stage algorithm. The first stage of the multi-stage algorithm may include training deep neural network models to simultaneously predict the visibility and locations of the landmark points or the endpoints of control splines based on down-sized input images of cut-out garment sprites. The second stage of the multi-stage algorithm may include refining the positions of the landmark points and or the endpoints of control splines by snipping the nearest point of the garment silhouettes, either in the form of a binary mask or in the form of fitted Bezier splines. The third stage of the multi-stage algorithm may include programmatically generating the handles of the Bezier curves (for control splines) using a heuristic approach.

Further, for deep neural network model training, first a coarse neural network model is pre-trained on public garment landmark datasets (e.g. DeepFashion [e.g. Z. Liu, P. Luo, S. Qiu, X. Wang, and X. Tang. Deepfashion: *"Powering robust clothes recognition and retrieval with rich annotations"*. In Proceedings of the IEEE Conference on Computer Vision and Pattern Recognition, pages 1096-1104, 2016]) and internal datasets. For example, the internal dataset may include over 60,000 garment mannequin photos with quality-control garment landmarks and control splines with data augmentation of translation, rotation, and scaling. Thereafter, the pre-trained deep neural network models may be fine-tuned based on a small dataset of retailer product photos with manual-annotations of garment landmarks and control splines to adapt to new model poses and camera views. Furthermore, a visibility-masked regress loss function [e.g. Z. Liu, P. Luo, S. Qiu, X. Wang, and X. Tang: *"Deepfashion: Powering robust clothes recognition and retrieval with rich annotations"*. In Proceedings of the IEEE Conference on Computer Vision and Pattern Recognition, pages 1096-1104, 2016] may be used for model training. The visibility-masked regress loss function is shown in equation 2 below.

$$\text{Loss}_{landmark} = \sum_{i=1}^{L} v_i \|X_i - X_{i,gt}\|^2, \quad (2)$$

wherein,

L is the total number of landmarks/endpoints to predict, $v_i$ and $x_i$ stands for the binary visibility labels and 2D positions of each landmark/control point i=1,2, ..., L.

In further embodiments, the garment cut-out and layer dividing module may be used to split further the garment texture into one or more layers corresponding to one or more body parts. For example, a leg wear may be split into two layers comprising a left-leg layer and a right-leg layer. The garment cut-out and layer dividing module may use a two-stage algorithm to split the garment texture into one or more layers. The first stage of the two-stage algorithm includes using performing deep neural network coarse segmentation on a downsized image (such as 512×512 size image). As a method of implementation, the deep neural network models (e.g. SegNet [e.g. V. Badrinarayanan, A. Kendall, and R. Cipolla: *"Segnet: A deep convolutional encoder-decoder architecture for image segmentation"*. IEEE Transactions on Pattern Analysis and Machine Intelligence, 2017], DeepLab [e.g. L. Chen, G. Papandreou, L. Kokkinos, K. Murphy, and A. L. Yuille: *"DeepLab: Semantic Image Segmentation with Deep Convolutional Nets,* *Atrous Convolution, and Fully Connected CRFs"*, arXiv preprint, 2016] may be trained using the product photos in Red Green Blue (RGB) or Red Green Blue Alpha (RGBA) formats as input and corresponding manually-labelled semantic label image as outputs. Accordingly, after the first stage processing, a coarse split of the left leg is obtained. The second stage of the two-stage algorithm includes performing a Markov-random field optimisation (e.g. GrabCut [e.g. C. Rother, V. Kolmogorov, and A. Blake: *"GrabCut: Interactive foreground extraction using iterated graph cuts"*, ACM Trans. Graph., vol. 23, pp. 309-314, 2004] or Dense-CRF [e.g. L. Chen, G. Papandreou, L. Kokkinos, K. Murphy, and A. L. Yuille: *"DeepLab: Semantic Image Segmentation with Deep Convolutional Nets, Atrous Convolution, and Fully Connected CRFs"*, arXiv preprint, 2016]) on the full image to refine the segmentation mask. Accordingly, after the second stage processing, a fine split of the left leg is obtained.

According to another embodiment, the garment cut-out and layer dividing module may use a multi-branch variant of a conventional segmentation neural network (e.g. DeepLab [e.g. L. Chen, G. Papandreou, L. Kokkinos, K. Murphy, and A. L. Yuille: *"DeepLab: Semantic Image Segmentation with Deep Convolutional Nets, Atrous Convolution, and Fully Connected CRFs"*, arXiv preprint, 2016]) to split the garment texture into one or more layers.

In further embodiments, the model body pose prediction module may be configured to perform a body pose detection from an input model image used for garment digitisation. The model body pose prediction module may return metadata information including, but not limited to, 2D/3D body joint positions, body joint visibility/occlusion information in the camera view of the image and 2D/3D skeleton layouts. The model body pose prediction module 110 may be implemented using deep neural networks and/or other computer vision approaches (e.g. OpenPose [e.g. Z. Cao and T. Simon and S. Wei and Y. Sheikh: *"Realtime Multi-Person 2D Pose Estimation using Part Affinity Fields"*. In Proceedings of the IEEE Conference on Computer Vision and Pattern Recognition, 2017]).

In further embodiments, the camera view classification module may be configured to classify the input image to a discrete set of approximate camera view angles with labels e.g. "Front", "Back", "Front left", etc. The camera view classification module may be implemented using a machine learning classifier (e.g. random forests [e.g. J. Shotton, M. Johnson, R. Cipolla: *"Semantic Texton Forests for Image Categorization and Segmentation"* in Proceedings of the IEEE Conference on Computer Vision and Pattern Recognition, Jun. 1, 2008], or standard deep neural networks for classification [e.g. C. Szegedy, W. Liu, Y. Jia, P. Sermanet, S. Reed, D. Anguelov, D. Erhan, V. Vanhoucke and A. Rabinovich: *"Going deeper with convolutions"*. In Proceedings of the IEEE Conference on Computer Vision and Pattern Recognition, pages 1-9, 2015], [e.g. A. Krizhevsky, I. Sutskever, and G. E. Hinton: *"Imagenet classification with deep convolutional neural networks"*. NIPS, 1(2):4, 2012] which may be trained on a number of labelled model image data of different camera views.

Furthermore, the data processing arrangement predicts automatically body parameters or measurements of the model. Thereafter, the data processing arrangement renders the body parameters or measurements selectable from height, weight, bust, waist, hips. The data processing arrangement uses a deep neural network model for implementing the interactive garment model.

In some embodiments, the body pose matching and pose changing module may be configured to detect the underlying body pose in an input image and adjust the pose of a 3D virtual body model to match that in the input image. Accordingly, the body pose matching and pose changing module may first create a body pose pool of generated model images {Is}, by projecting a standard-shape virtual avatar of a number of distinct representative body poses which are typically used in fashion photography, in different camera views. Then, the body pose matching and pose changing module may precompute the corresponding body joint positions, skeleton layout, and joint visibility for each model pose image (Is) in the pool offline. This may be done either manually or automatically using a computer-vision-based 2D body pose detector e.g. OpenPose [e.g. Z. Cao and T. Simon and S. Wei and Y. Sheikh: "*Realtime Multi-Person 2D Pose Estimation using Part Affinity Fields*". *In Proceedings of the IEEE Conference on Computer Vision and Pattern Recognition,* 2017]. Thereafter, the body pose matching and pose changing module may detect the body joint positions, skeleton layout and joint visibility in the input query model image ($I_q$) used for garment digitisation.

Moreover, the body pose matching and pose changing module may find the most similar model pose image ($I_s^*$) defined in the body pose pool, by comparing the extracted 2D joints positions, skeleton layouts, joint visibility, etc. with each candidate pose image ($I_s$) in the pool with a similarity metric. For example, an inner-product similarity over all the bones may be defined using equation 3 below.

$$\sum_{(i,j)\in S} v_{i,j}(q_i - q_j)\cdot(c_i - c_j), \quad (3)$$

wherein, each index pair (i, j) defines a bone in the common skeleton system S defined; $v_{i,j}$ are the binary visibility labels of the bone (i, j), which is defined as 0 if the bone is detected to be occluded in the query image $I_q$ and 1 if visible; $q_i$ and $q_j$ are the 2D positions of the starting and ending joints of the bone (i,j) in the query image $I_q$, and $c_i$ and $c_j$ are the 2D positions of the starting and ending joints of the bone (i,j) in the a candidate pose image ($I_s$).

Further, the body pose matching and pose changing module may use the underlying body pose and camera view of the most similar model pose image ($I_s^*$) as the digitisation and rendering pose of the standard virtual avatar for the garment model in the specified viewpoint.

Further, the garment sprite alignment module may be configured to create a 2D thin-plate splines (TPS) warp field that may apply a spatial transformation on the cut-out garment texture sprites so that it may be laid on the proper positions on the standard body avatar used for garment digitisation. Therefore, source-sink control points pairs of the TPS model may be automatically generated based on the relevant set of corresponding joint positions of the input image and digitisation model images. Further, the scale of the sprites may also be automatically adjusted by computing the average scaling ratio of the relevant bone lengths.

Furthermore, the garment geometry and physics reconstruction module may be configured to apply a 2.5 D multi-view garment physics simulation on the multi-projections of the 3D body avatar model [see for example T. Adeyoola, N. Brown, N. Trott, E. Herbert, D. Robertson, J. Downing, N. Day, R. Boland, T. Boucher, J. Townsend, E. Clay, T. Warren, and A. Unadkat: "*Computer implemented methods and systems for generating virtual body models for garment fit visualisation*". UK Patent GB2488237, Metail Limited, August 2012.]. Finally, a one or more digital garment models may be obtained.

Furthermore, the first subsystem stores one or more digital garment models in a garment database. Specifically, the first subsystem stores selectively one or more of the following in the garment database: image data, unsegmented original garment images, segmented garment sprites in different pose, camera views, metadata data, control points, splines positions, semantic labels, style attributes, colour attributes, texture attributes, shape attributes, fit styles attributes, vertical drapes attributes, cuff, hem height, waist line position, material stretch attributes, material strain attributes.

According to some embodiments, the second subsystem may include one or more of UI's for virtual fitting room, a body shape estimation module, a garment physics simulation module and an outfitting and rendering module.

Furthermore, the data processing arrangement receives inputs from the customer, wherein the inputs include one or more consumer body metrics, and the second subsystem is configured to generate automatically a 3D body avatar representing the consumer's body shape. Furthermore, the data processing system receives inputs from the customer for defining a preferred body pose, and the second subsystem creates automatically an identical body pose for the 3D body avatar. In some embodiments, UI's for a virtual fitting room may include UI's for the customer to provide their body metrics, measurements, and other input 1610 for generating a 3D body avatar representing their body shape and selecting preferred body pose [e.g. T. Adeyoola, N. Brown, N. Trott, E. Herbert, D. Robertson, J. Downing, N. Day, R. Boland, T. Boucher, J. Townsend, E. Clay, T. Warren, and A. Unadkat: "*Computer implemented methods and systems for generating virtual body models for garment fit visualisation*". UK Patent GB2488237, Metail Limited, August 2012]. Furthermore, the UI's for a virtual fitting room may include UI's that allows a customer to select garments to be dressed onto the virtual avatar.

Furthermore, the data processing arrangement renders the consumer's body metrics selectable from height, weight, cup size, bust circumference, waist circumference, hips circumference, inside leg length. Furthermore, the second subsystem creates the 3D body avatar representing the consumer's body shape using a 3D statistical body model with an embedded skeleton and a regression application. In some embodiments, the body shape estimation module may generate a full 3D geometry of a body avatar from body measurements and parameters provided by the customer in the UI (e.g. height, weight, cup size, bust circumference, waist circumference, hips circumference, inside leg length, etc.). The body shape estimation module may be implemented based on a 3D statistical body model with skeleton embedded and applying a regression to estimate intrinsic model parameters from input measurements for 3D reconstruction [e.g. T. Adeyoola, N. Brown, N. Trott, E. Herbert, D. Robertson, J. Downing, N. Day, R. Boland, T. Boucher, J. Townsend, E. Clay, T. Warren, and A. Unadkat: "*Computer implemented methods and systems for generating virtual body models for garment fit visualisation*". UK Patent GB2488237, Metail Limited, August 2012].

Furthermore, the second subsystem selects automatically one or more digital garment models from a garment database which match a consumer's garment choice input to the production system. Accordingly, in some embodiments, the garment database may be configured to provide one or more digital garment models comprising the texture, geometry, finite element representations, and other metadata.

Further, the second subsystem simulates automatically a drape and a fit of the digital garment model onto the 3D body avatar. The second subsystem may simulate the drape and the fit of the digital garment model onto the 3D body avatar using finite-element analysis. In some embodiments, the garment physics simulation module may be configured to perform finite-element analysis of the digital garment model(s) on the generated 3D body avatar of the customers. At the runtime, the garment physics simulation module models how the garment model will drape and fit against, or on, a customer body shape.

Furthermore, the second subsystem composites automatically multiple individual garment models in a correct layering order and then displays the 3D body avatar in an outfit of one or more selected garments. In some embodiments, the outfitting and rendering module may be configured to composite multiple individual garment models in the correct layering order and then display the 3D body avatar of the customer in an outfit of one or more selected garments. The output of the second subsystem is a dressed body avatar(s) (in 2D/3D) visualization with the target garment.

Furthermore, the data processing arrangement generates the digital garment model to comprise one or more of: garment geometry information, a 2D silhouette, a 3D mesh model, garment appearance information, cut-out garment texture sprites, texture maps for a 3D mesh, alpha maps, garment metadata information, landmark points, control splines, garment style attributes, garment colour attributes, garment texture attributes, garment shape attributes, garment fit styles attributes, garment vertical drape attributes, a garment cuff, a garment hem height, a garment waist line position, a garment material stretch, garment strain attributes.

In another aspect, there is provided a method of using a production system to design or produce a garment. The method may include using a data processing arrangement of the production system to execute one or more software products to create an interactive environment for hosting the interactive garment model. Furthermore, the method may include arranging for the two dimensional images to comprise at least a garment, a model wearing the garment and a background. Yet further, the method may include using the production system to acquire the one or more two dimensional images of a garment from one or more viewing angles. Moreover, the method may include using the production system to create a three dimensional model of the garment.

Furthermore, the method may include using the data processing arrangement to segment automatically the garment from the model and the background. Yet furthermore, the method may include using the data processing arrangement to identify and recreate automatically any occluded sections of the garment within the two dimensional image to produce a non-occluded garment. Moreover, the method may include arranging for the data processing arrangement to use at least one of: a patch based algorithm, a diffusion based algorithm.

Furthermore, the method may include using the data processing arrangement to predict automatically a visibility of and locations of one or more garment landmarks and/or splines on the model within the image.

The method may further include using the data processing arrangement to acquire a plurality of model images of the model from a plurality of viewing angles and in a plurality of body poses. Furthermore, the method may include using the data processing arrangement to predict automatically body parameters or measurements of the model.

Furthermore, the method may include using the data processing arrangement to render the body parameters or measurements selectable from height, weight, bust, waist, hips.

Furthermore, the method may include arranging for the data processing arrangement to use a deep neural network model for implementing the interactive garment model.

Furthermore, the method may include using the data processing arrangement to acquire the one or more two dimensional images from at least one of: an internet web site, a digital camera device.

Furthermore, the method may include arranging the data processing arrangement to comprise a first subsystem which creates a digital garment model of a garment from 2D images of the garment, and to comprise a second subsystem which simulates the digital garment model onto a 3D body avatar of a consumer.

Furthermore, the method may include using the first subsystem to store one or more digital garment models in a garment database.

Furthermore, the method may include using the first subsystem to store selectively one or more of the following in the garment database: image data, unsegmented original garment images, segmented garment sprites in different pose, camera views, metadata data, control points, splines positions, semantic labels, style attributes, colour attributes, texture attributes, shape attributes, fit styles attributes, vertical drapes attributes, cuff, hem height, waist line position, material stretch attributes, material strain attributes.

Furthermore, the method may include using the data processing arrangement to receive inputs from the customer, wherein the inputs include one or more consumer body metrics, and using the second subsystem to generate automatically a 3D body avatar representing the consumer's body shape.

Furthermore, the method may include using the data processing arrangement to render the consumer's body metrics selectable from height, weight, cup size, bust circumference, waist circumference, hips circumference, inside leg length.

Furthermore, the method may include using the second subsystem to create the 3D body avatar representing the consumer's body shape using a 3D statistical body model with an embedded skeleton and a regression application.

Furthermore, the method may include using the data processing system to receive inputs from the customer to define a preferred body pose, and to configure the second subsystem to create automatically an identical body pose for the 3D body avatar.

Furthermore, the method may include using the second subsystem to select automatically one or more digital garment models from a garment database which match a consumer's garment choice input.

Furthermore, the method may include arranging for the data processing arrangement to provide a user interface (UI) for the customer to use to input data to the production system.

Furthermore, the method may include using the second subsystem to simulate automatically a drape and a fit of the digital garment model onto the 3D body avatar.

Furthermore, the method may include using the second subsystem to simulate the drape and the fit of the digital garment model onto the 3D body avatar using finite-element analysis.

Furthermore, the method may include using the second subsystem to composite automatically multiple individual garment models in a correct layering order and then to display the 3D body avatar in an outfit of one or more selected garments.

Furthermore, the method may include using the data processing arrangement to generate the digital garment model to comprise one or more of: garment geometry information, a 2D silhouette, a 3D mesh model, garment appearance information, cut-out garment texture sprites, texture maps for a 3D mesh, alpha maps, garment metadata information, landmark points, control splines, garment style attributes, garment colour attributes, garment texture attributes, garment shape attributes, garment fit styles attributes, garment vertical drape attributes, a garment cuff, a garment hem height, a garment waist line position, a garment material stretch, garment strain attributes.

The present disclosure provides a facility to create a massively scalable engagement feature in any direct-to-consumer application by quickly and cheaply digitising any garment from Internet images. Furthermore, the disclosed systems and methods may be used to provide a low-cost alternative to known photography-based digitisation facilities. Moreover, the disclosed methods and systems work without creating new samples, thereby removing the photography stage that occurs in the current digitisation pipeline entirely. Instead, the disclosed methods and systems may use existing high-quality 2D images, and e-commerce product photos (potentially scraped from retailers' websites), self-photographed sample photos uploaded by the users, or internet images as the input, and from them create (e.g. interactive) 3D digital garment models which are outfit-able in virtual try-on products. Furthermore, the disclosed methods and systems provide a very low-cost, high coverage, and highly scalable solution to garment digitization.

DETAILED DESCRIPTION IN RELATION TO THE DRAWINGS

A production system for producing a garment may include two subsystems. The first subsystem may be a high definition (HD) subsystem 100 for creating digital garment models (including clothing, accessories, and footwear) which are usable for virtual try-on and outfitting from 2D images of garment Stock Keeping Units (SKUs) and storing them into a garment database. The high definition subsystem 100 is explained in further detail in conjunction with FIG. 1 (which is provided as an example) below. The second subsystem 1600 may be a run-time subsystem for creating a customer's 3D body model, loading stored digital garment models from the garment database, simulating digital garment models on customer's body shape/pose, compositing different digital garment models into an outfit, and rendering a dressed avatar of the customer for final visualization. The second subsystem 1600 is explained in further detail in conjunction with FIG. 16 (which is provided as an example) below.

Referring to FIG. 1, illustrated is a block diagram of an example HD garment digitisation subsystem 100, in accordance with an embodiment of the present disclosure. A HD garment digitisation subsystem 100 may be used to create digital garment models usable for virtual try-on and outfitting from one or more 2D images of garment SKU's, including but not limited to e-commerce product photos on retailer websites, existing mannequin or model photography from retailers, and images of dressed person(s) obtained from the Internet. The garments may include all clothing, accessories and footwear that might be worn or carried by a consumer. The garment images may be in distinct camera views or distinct body poses.

The output of the HD garment digitisation subsystem 100 is a digital garment model stored in the garment database, which is suitable for virtual try-on and outfitting on 3D avatar of different body shapes.

The HD garment digitisation subsystem 100 may include one or more of API's and UI's 102 for garment photo uploading, a garment texture in-painting module 104, a garment cut-out and layer dividing module 106, a landmark and control spline prediction module 108, a model body pose prediction module 110, a camera view classification module 112, a body pose matching and pose changing module 114, a garment sprite alignment module 116, a garment geometry and physics reconstruction module 118, a garment database 120 and a labelled garment image dataset 122, a body pose pool 124 and a standard reference avatar 126.

The API's and UI's 102 for garment photo uploading may allow API users (such as owners of a mini shop on the Amazon™ or eBay™), to upload their own product photos in distinct views to create digital garment models suitable for online virtual try-on.

Furthermore, the garment texture in-painting module 104 may be used to semi-automatically complete any occluded garment texture (or occluded sections) in a product photo e.g. with an interactive UI. The occluded textures may be caused by occluding hair or arms of the model.

The garment texture in-painting module 104 may fill up the occluded texture either by cloning the texture samples or by interpolating the colours from neighbouring unoccluded areas. The goal is to generate an overall visually plausible and coherent texture of the whole garment. Accordingly, two streams of image processing based algorithms may be implemented for handling different types of garment patterns. These include patch based algorithms (e.g. A. Criminisi, P. Perez and K. Toyama: "*Region Filling and Object Removal by Exemplar-Based Image Inpainting*", IEEE TRANSACTIONS ON IMAGE PROCESSING, Vol. 13, No. 9, September 2004) and diffusion-based algorithms.

The patch based algorithms may fill up the target area by cloning texture patch samples from unoccluded regions under certain constraints of filling priority, such as distance to the boundary, or gradient consistency. The patch based algorithms may be used for handling repetitive patterns or random patterns.

Figure 2:
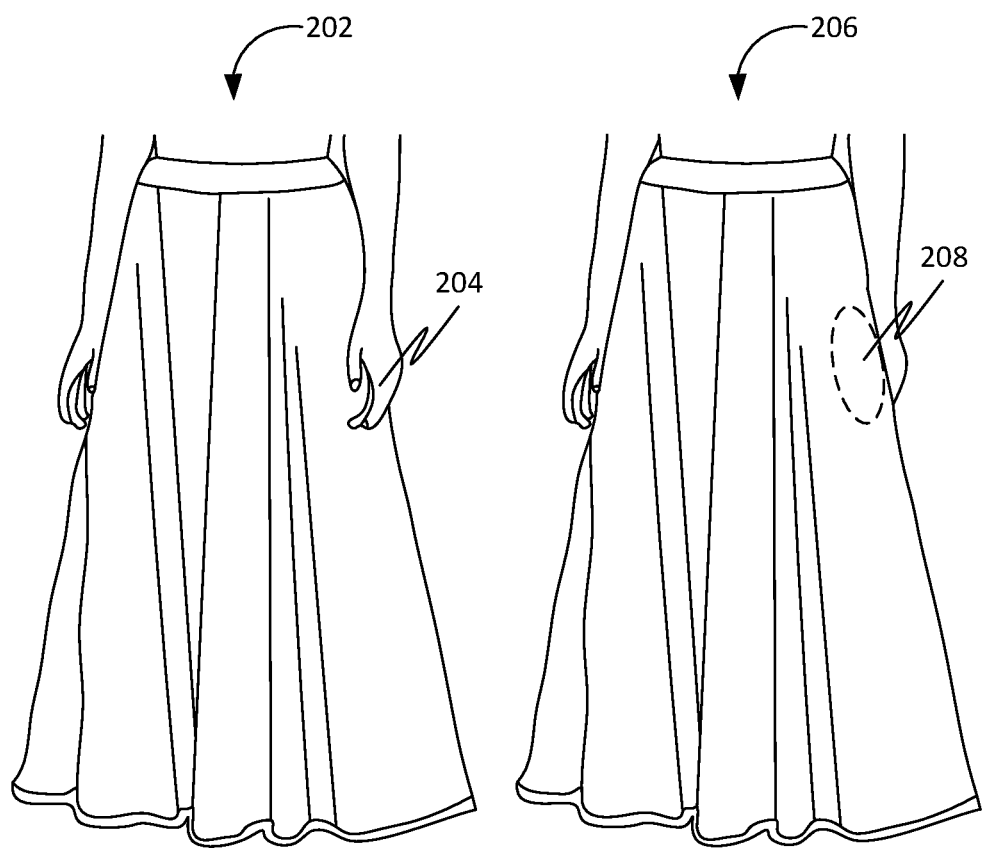
FIG. 2 is an illustration of a garment texture completion in accordance with an exemplary embodiment.

In FIG. 2, there is shown an illustration of an example garment texture completion in accordance with an exemplary embodiment. An input product model photo 202 shows a model wearing a garment. A hand 204 of the model occludes a portion of the garment. An in-painted garment photo 206 may be obtained after the patch based algorithms process the input product model photo 202. As shown, the occluded portion 208 of the garment has been filled using texture patch samples.

Figure 3:
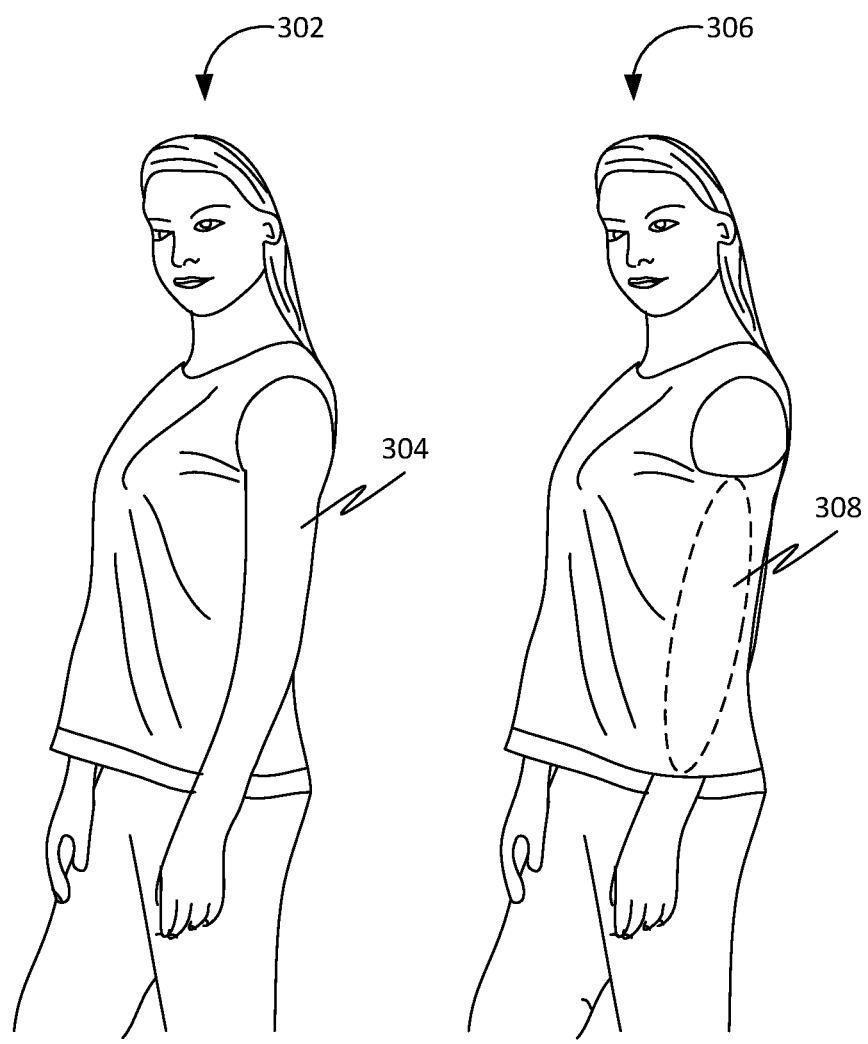
FIG. 3 is an illustration of a garment texture completion in accordance with an exemplary embodiment.

In FIG. 3, there is shown an illustration of an example garment texture completion in accordance with an exemplary embodiment. An input product model photo 302 shows a model wearing a garment. An arm 304 of the model occludes a portion of the garment. An in-painted garment photo 306 may be obtained after the patch based algorithms process the input product model photo 302. As shown, the occluded portion of the garment has been filled using texture patch sample(s) 308.

The diffusion-based algorithms may be used for handling uniform-coloured patterns with gradual shading variations.

An example approach is harmonic interpolation, which assumes that there is a smooth/continuous colour function, i.e. f(x,y) and that the values at the boundary are known. The smoothness may be represented as a second order partial differential equations (PDE), shown in equation 1 below.

$$\nabla^2 f(x,y)=0, \partial\Omega=I(x,y), \quad (1)$$

wherein,
$\partial\Omega$ represents a boundary of an occluded portion,
$\Omega$ represents an occluded portion.
By solving the equation 1, the target region may be filled up by propagating colour smoothly from the boundary to the inside.

Figure 4:
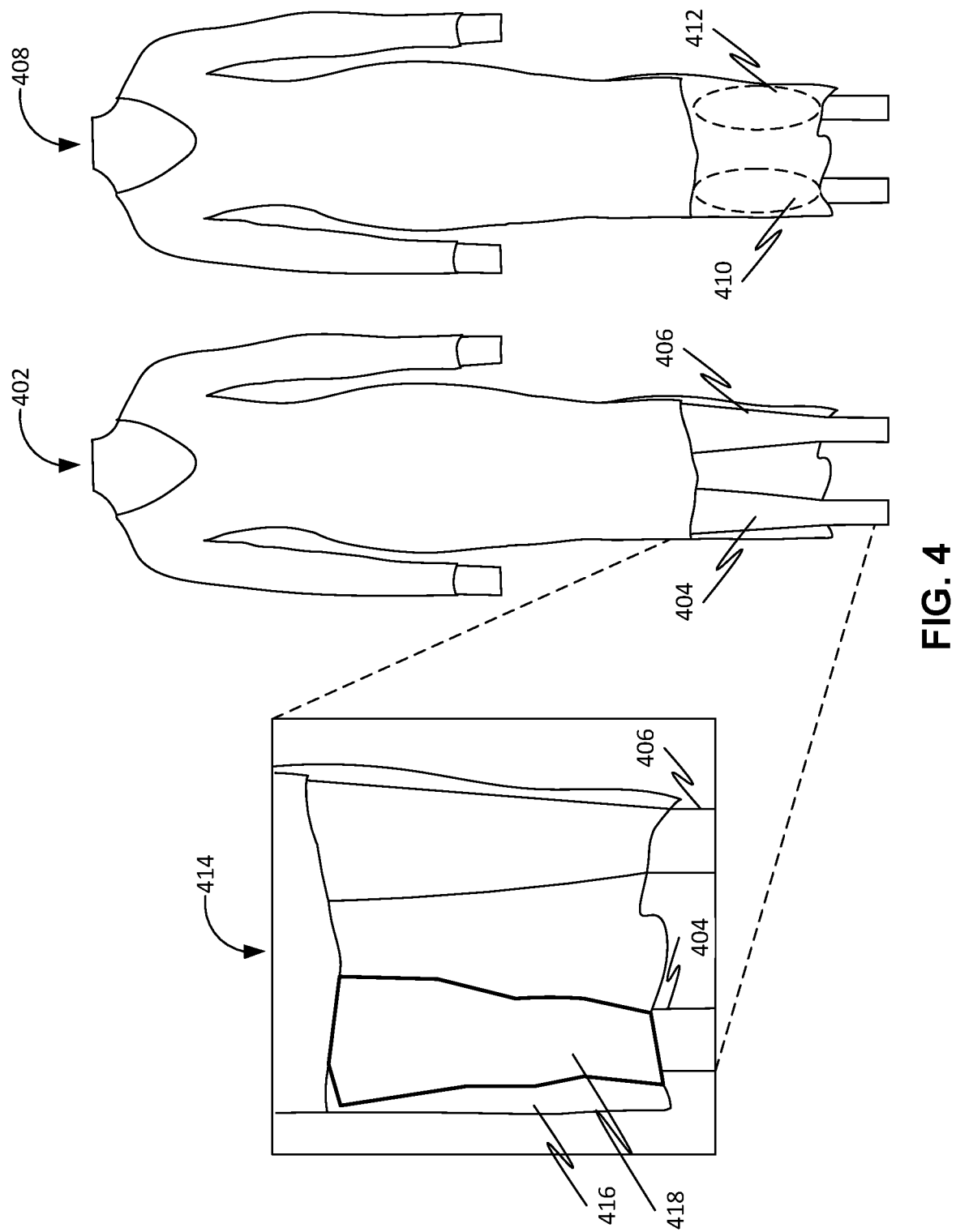
FIG. 4 is an illustration of a garment texture completion in accordance with an exemplary embodiment.

In FIG. 4, there is shown an illustration of an example garment texture completion in accordance with an exemplary embodiment. An input product model photo 402 shows a model wearing a garment. The legs 404-406 of the model occlude a portion of the garment. An in-painted garment photo 408 may be obtained by using a harmonic interpolation approach, wherein the diffusion-based algorithms process the input product model photo 402. As shown, the occluded portions 410-412 of the garment have been filled using equations 1. A magnified view 414 of the garment shows that a colour at a boundary ($\partial\Omega$) 416 of an occluded portion ($\Omega$) 418 may be used to fill up the occluded portion ($\Omega$) 418.

In order to support visualizing digital garment models on different body shape and body poses for virtual try-on, a complete garment texture is necessary, in an example. Accordingly, in an example, the garment texture in-painting module 104 is essential because the occluded texture of the garment may become visible in a different pose/body shapes.

The garment cut-out and layer dividing module 106 may be used to automatically segment the garment textures (the foreground) from the model (the body) and the rest of background in a garment product photo especially when additional segmentation-assisting photography hardware (see e.g. D. Robertson: "*System and method for image processing and generating a body model*", September 2010; U.S. patent application Ser. No. 12/881,861) is not available. The garment cut-out and layer dividing module 106 may perform semantic segmentation of garment product photo using a deep neural network implemented using DeepLab [e.g. L. Chen, G. Papandreou, L. Kokkinos, K. Murphy, and A. L. Yuille: "*DeepLab: Semantic Image Segmentation with Deep Convolutional Nets, Atrous Convolution, and Fully Connected CRFs*", arXiv preprint, 2016].

Figure 5:
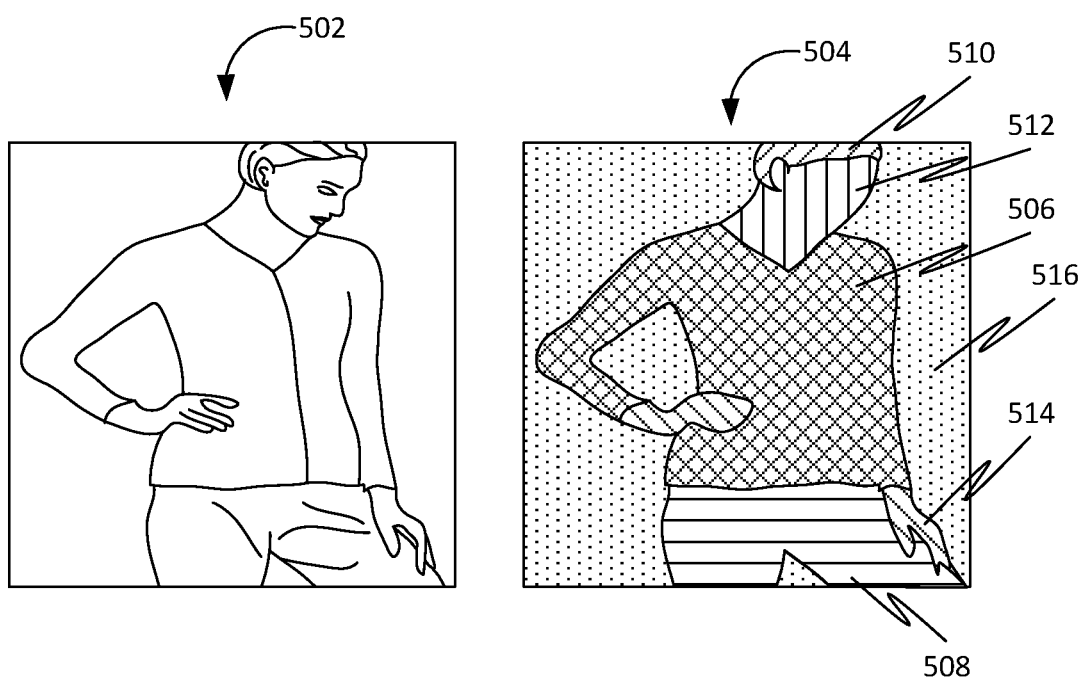
FIG. 5 is an illustration of segmented garment textures in accordance with an exemplary embodiment.

In FIG. 5, there is shown an illustration of example segmented garment textures in accordance with an exemplary embodiment. An input product model photo 502 shows a model wearing a garment. The output photo 504 with segmented garment textures 506-508 may be obtained after the input product model photo 502 is processed by the garment cut-out and layer dividing module 106. Furthermore, the body of the model (hair 510, face 512 and hands 514) is also segmented. Moreover, the background 516 in the input product model photo 502 is also segmented. In an embodiment, the input product model photo 502 may be processed by DeepLab [e.g. L. Chen, G. Papandreou, L. Kokkinos, K. Murphy, and A. L. Yuille: "*DeepLab: Semantic Image Segmentation with Deep Convolutional Nets, Atrous Convolution, and Fully Connected CRFs*", arXiv preprint, 2016] to obtain the segmented output photo 504.

Figure 6:
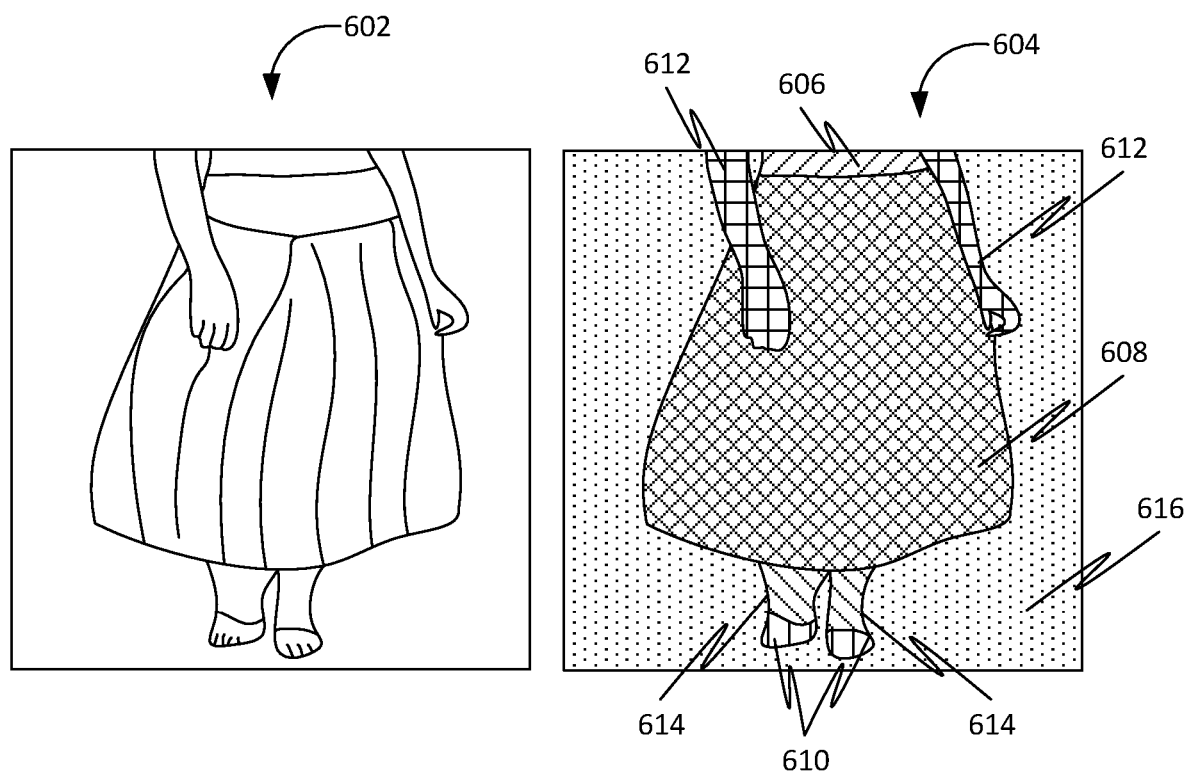
FIG. 6 is an illustration of segmented garment textures in accordance with an exemplary embodiment.

In FIG. 6, there is shown an illustration of example segmented garment textures in accordance with an exemplary embodiment. An input product model photo 602 shows a model wearing a garment. The output photo 604 with segmented garment textures 606-608 may be obtained after the input product model photo 602 is processed by the garment cut-out and layer dividing module 106. Furthermore, accessories such as shoes 610 are also segmented. Yet further, the body of the model (arms and hands 612 and legs 614) is also segmented. Moreover, the background 616 in the input product model photo 602 is also segmented. In an embodiment, the input product model photo 602 may be processed by DeepLab [e.g. L. Chen, G. Papandreou, L. Kokkinos, K. Murphy, and A. L. Yuille: "*DeepLab: Semantic Image Segmentation with Deep Convolutional Nets, Atrous Convolution, and Fully Connected CRFs*", arXiv preprint, 2016] to obtain the segmented output photo 604.

Furthermore, the garment cut-out and layer dividing module 106 may be used to further split the garment texture into one or more layers corresponding to one or more body parts. For example, a leg wear may be split into two layers comprising a left-leg layer and a right-leg layer as shown for example in FIG. 7. The garment cut-out and layer dividing module 106 may use a two-stage algorithm to split the garment texture into one or more layers.

Figure 7:
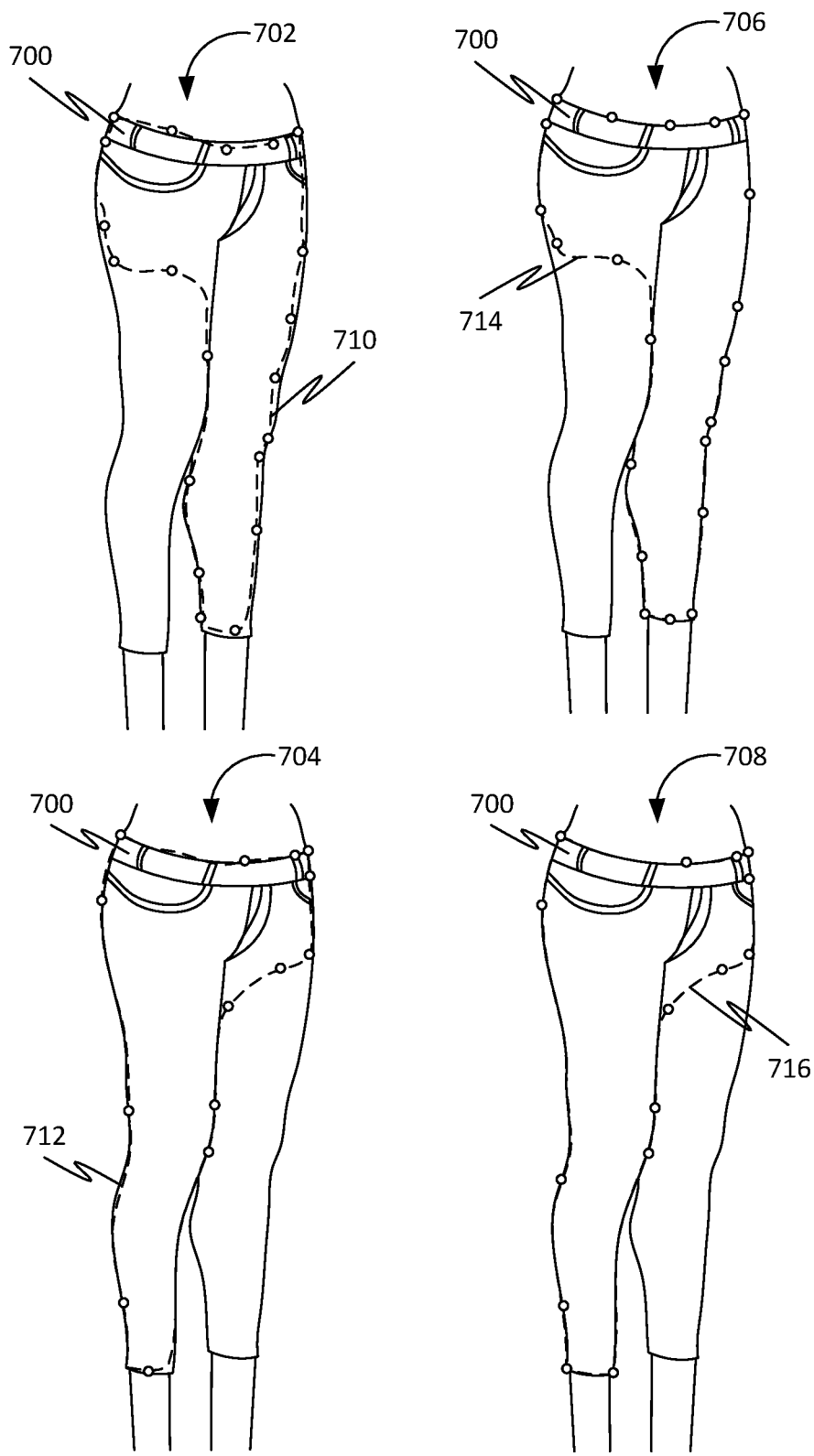
FIG. 7 is an illustration of output images obtained after using a two stage algorithm on an image of a leg wear, in accordance with an exemplary embodiment.

In FIG. 7, there is shown an illustration of example output images 702-708 obtained after the use of a two stage algorithm on an image of a leg wear 700, in accordance with an exemplary embodiment. The first stage of the two-stage algorithm includes using performing deep neural network coarse segmentation on a downsized image (such as 512× 512 size image). As a method of implementation, the deep neural network models (e.g. SegNet [e.g. V. Badrinarayanan, A. Kendall, and R. Cipolla. Segnet: "*A deep convolutional encoder-decoder architecture for image segmentation*". IEEE Transactions on Pattern Analysis and Machine Intelligence, 2017], DeepLab [e.g. L. Chen, G. Papandreou, L. Kokkinos, K. Murphy, and A. L. Yuille, "*DeepLab: Semantic Image Segmentation with Deep Convolutional Nets, Atrous Convolution, and Fully Connected CRFs*", arXiv preprint, 2016] may be trained using the product photos in Red Green Blue (RGB) or Red Green Blue Alpha (RGBA) formats as input and corresponding manually-labelled semantic label image as outputs. Accordingly, after the first stage processing, a coarse split of the left leg is obtained in the output image 702. The coarse-split is shown using a dotted line 710. Similarly, after the first stage processing, a coarse split of the right leg is obtained. The coarse-split is shown using a dotted line 712 in the output image 704.

The second stage of the two-stage algorithm includes performing a Markov-random field optimisation (e.g. GrabCut [e.g. C. Rother, V. Kolmogorov, and A. Blake, GrabCut: "*Interactive foreground extraction using iterated graph cuts*", ACM Trans. Graph., vol. 23, pp. 309-314, 2004] or Dense-CRF [e.g. L. Chen, G. Papandreou, L. Kokkinos, K. Murphy, and A. L. Yuille, "*DeepLab: Semantic Image Segmentation with Deep Convolutional Nets, Atrous Convolution, and Fully Connected CRFs*", arXiv preprint, 2016]) on the full image to refine the segmentation mask. Accordingly, after the second stage processing, a fine split of the left leg is obtained. The fine-split is shown using a dotted line 714 in the output image 706. Similarly, after the second stage processing, a fine split of the right leg is obtained. The fine-split is shown using a dotted line 716 in the output image 708.

According to an embodiment, the garment cut-out and layer dividing module 106 may use a multi-branch variant of a conventional segmentation neural network (e.g. DeepLab [e.g. L. Chen, G. Papandreou, L. Kokkinos, K. Murphy, and A. L. Yuille, "*DeepLab: Semantic Image Segmentation with Deep Convolutional Nets, Atrous Convolution, and Fully*

Connected CRFs", arXiv preprint, 2016]) to split the garment texture into one or more layers.

Figure 8:
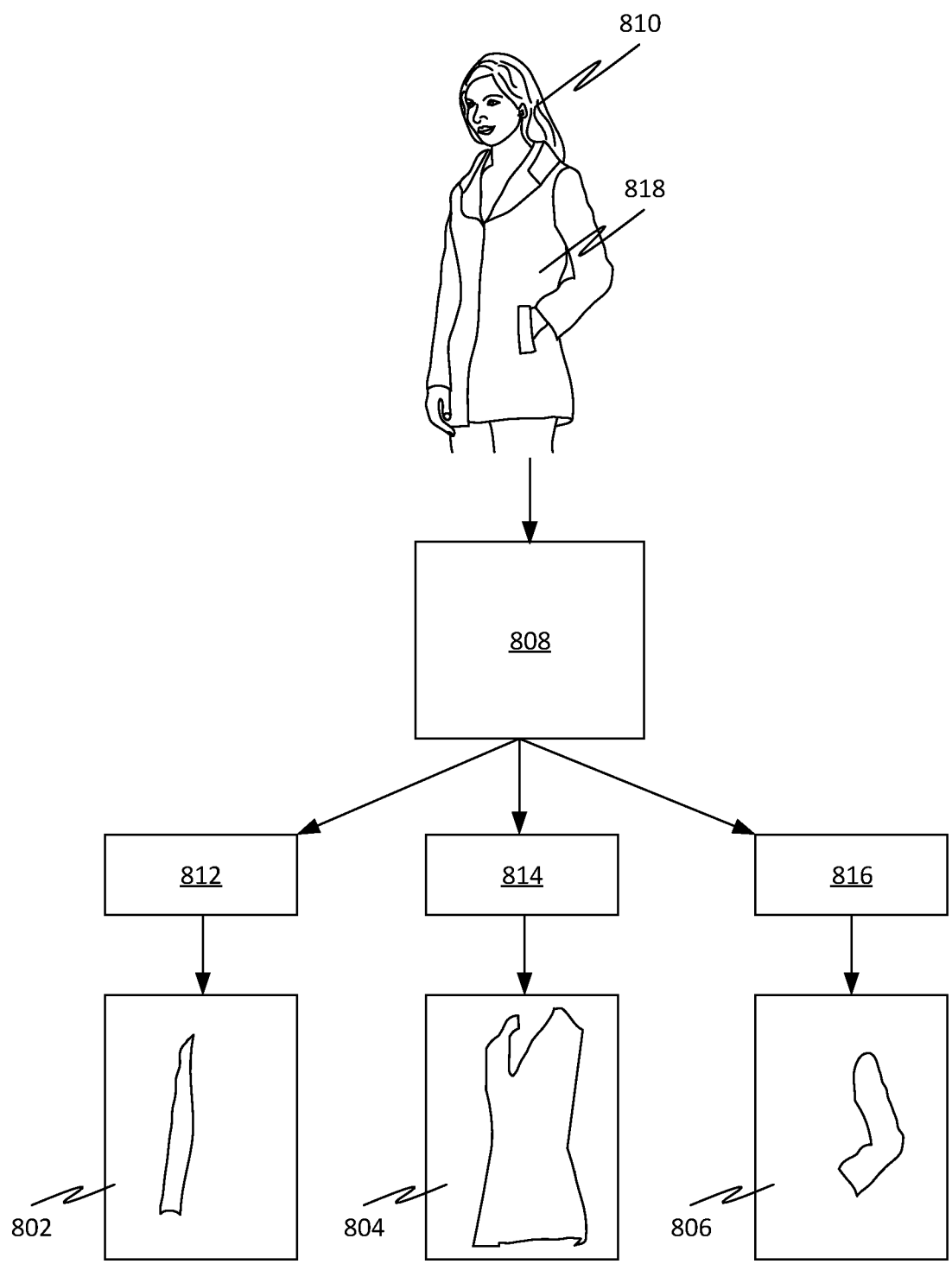
FIG. 8 is an illustration of output images obtained after using a multi-branch variant of a conventional segmentation neural network on an input image, in accordance with an exemplary embodiment.

In FIG. 8 there is shown an illustration of example output images 802-806 obtained after the use of multi-branch variant of a conventional segmentation neural network 808 on an input image 810, in accordance with an exemplary embodiment. In the multi-branch variant of a conventional segmentation neural network 808, the last convolutional layer or fully-connected layer, may be forked to predict multiple garment regions corresponding to different garment layers simultaneously. As shown, the multi-branch variant of a conventional segmentation neural network 808 may be forked into three networks 812-816. The input image 810 may show a model wearing a jacket 818. The three networks 812-816 predict the regions of three garment layers (a right sleeve, a torso, a left sleeve) of the jacket 818 simultaneously from single product photo, the input image 810. The regions of the three garment layers (the right sleeve, the torso, the left sleeve) are shown in the output images 802-806 respectively.

Furthermore, the landmark and control spline prediction module 108 may be configured to localise the landmarks characterising key positions on a garment. For example, the landmarks may correspond to the corners of the garment, positions of the armpit, etc. Further, the landmark and control spline prediction module 108 may be configured to predict control splines (e.g. in the form of Bezier splines) which may be used to indicate the layer orders of garments in an outfit. This module is important for initializing finite-element garment physics simulation.

Figure 9:
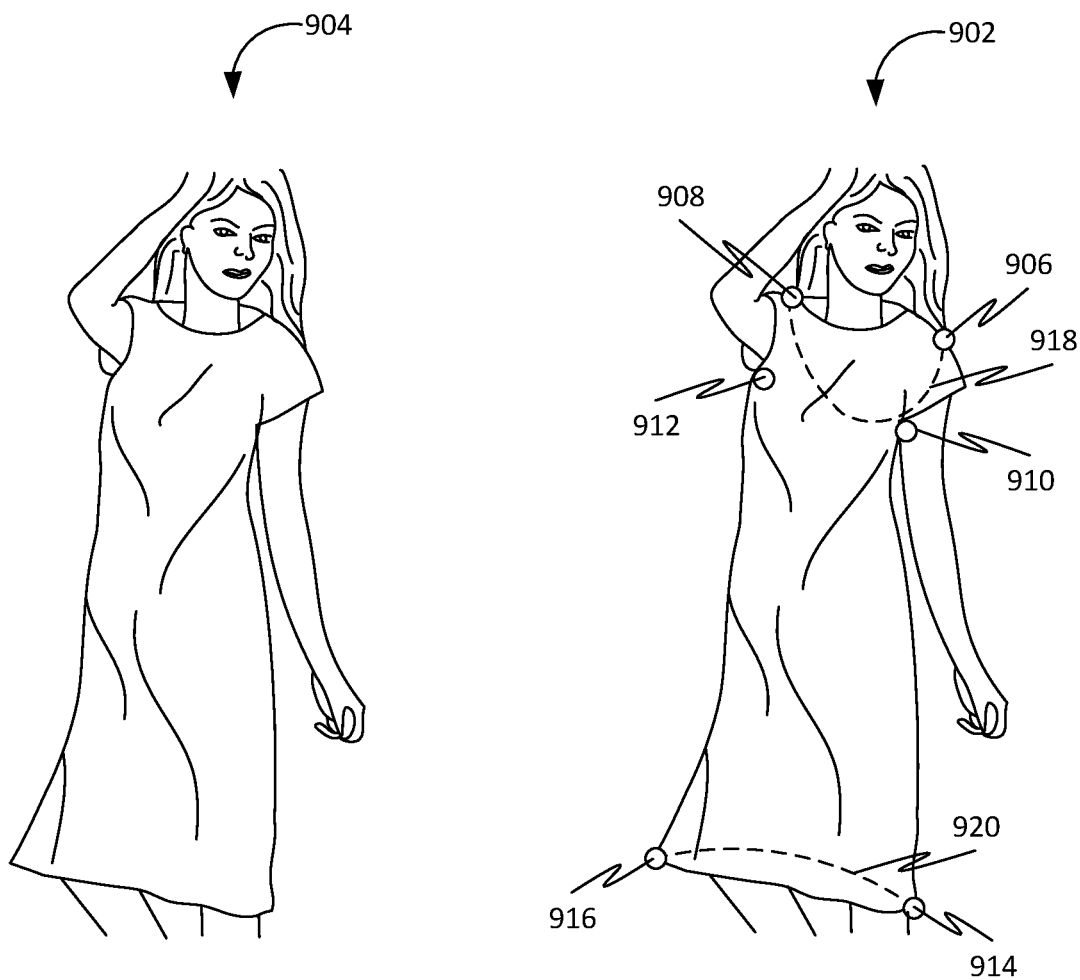
FIG. 9 is an illustration of an output image obtained after using a landmark and control spline prediction module on an input image, in accordance with an exemplary embodiment.

In FIG. 9, there is shown an example illustration of an output image 902 obtained after the use of the landmark and control spline prediction module 108 on an input image 904, in accordance with an exemplary embodiment. For example, the input image 904 may be obtained from a retailer's website. The landmark and control spline prediction module 108 may process the input image 904 to provide the output image 902 with marked landmarks 906-916 and control splines 918-920. Alternatively, the landmark and control spline prediction module 108 may process the input image 904 to provide the x-y positions and binary visibility labels of a set of garment landmarks or endpoints of control splines.

In some embodiments, the landmark and control spline prediction module 108 may be implemented based on using a multi-stage algorithm. The first stage of the multi-stage algorithm may include training deep neural network models to simultaneously predict the visibility and locations of the landmark points or the endpoints of control splines based on down-sized input images of cut-out garment sprites. The second stage of the multi-stage algorithm may include refining the positions of the landmark points and or the endpoints of control splines by snipping the nearest point of the garment silhouettes, either in the form of a binary mask or in the form of fitted Bezier splines. The third stage of the multi-stage algorithm may include programmatically generating the handles of the Bezier curves (for control splines) using a heuristic approach.

Furthermore, for deep neural network model training, first a coarse neural network model is pre-trained on public garment landmark datasets (e.g. DeepFashion [e.g. Z. Liu, P. Luo, S. Qiu, X. Wang, and X. Tang: "Deepfashion: Powering robust clothes recognition and retrieval with rich annotations". In Proceedings of the IEEE Conference on Computer Vision and Pattern Recognition, pages 1096-1104, 2016] and internal datasets (such as the labelled garment image dataset 122). For example, the internal dataset may include over 60,000 garment mannequin photos with quality-control garment landmarks and control splines with data augmentation of translation, rotation, and scaling. Thereafter, the pre-trained deep neural network models may be fine-tuned based on a small dataset of retailer product photos with manual-annotations of garment landmarks and control splines to adapt to new model poses and camera views. Further, a visibility-masked regress loss function [e.g. Z. Liu, P. Luo, S. Qiu, X. Wang, and X. Tang: "Deepfashion: Powering robust clothes recognition and retrieval with rich annotations". In Proceedings of the IEEE Conference on Computer Vision and Pattern Recognition, pages 1096-1104, 2016.] may be used for model training. The visibility-masked regress loss function is shown in equation 2 below.

$$\text{Loss}_{landmark} = \sum_{i=1}^{L} v_i \|X_i - X_{i,gt}\|^2, \tag{2}$$

wherein, L is the total number of landmarks/endpoints to predict, $v_i$ and $x_i$ stands for the binary visibility labels and 2D positions of each landmark/control point $i=1,2,\ldots L$.

Figure 10:
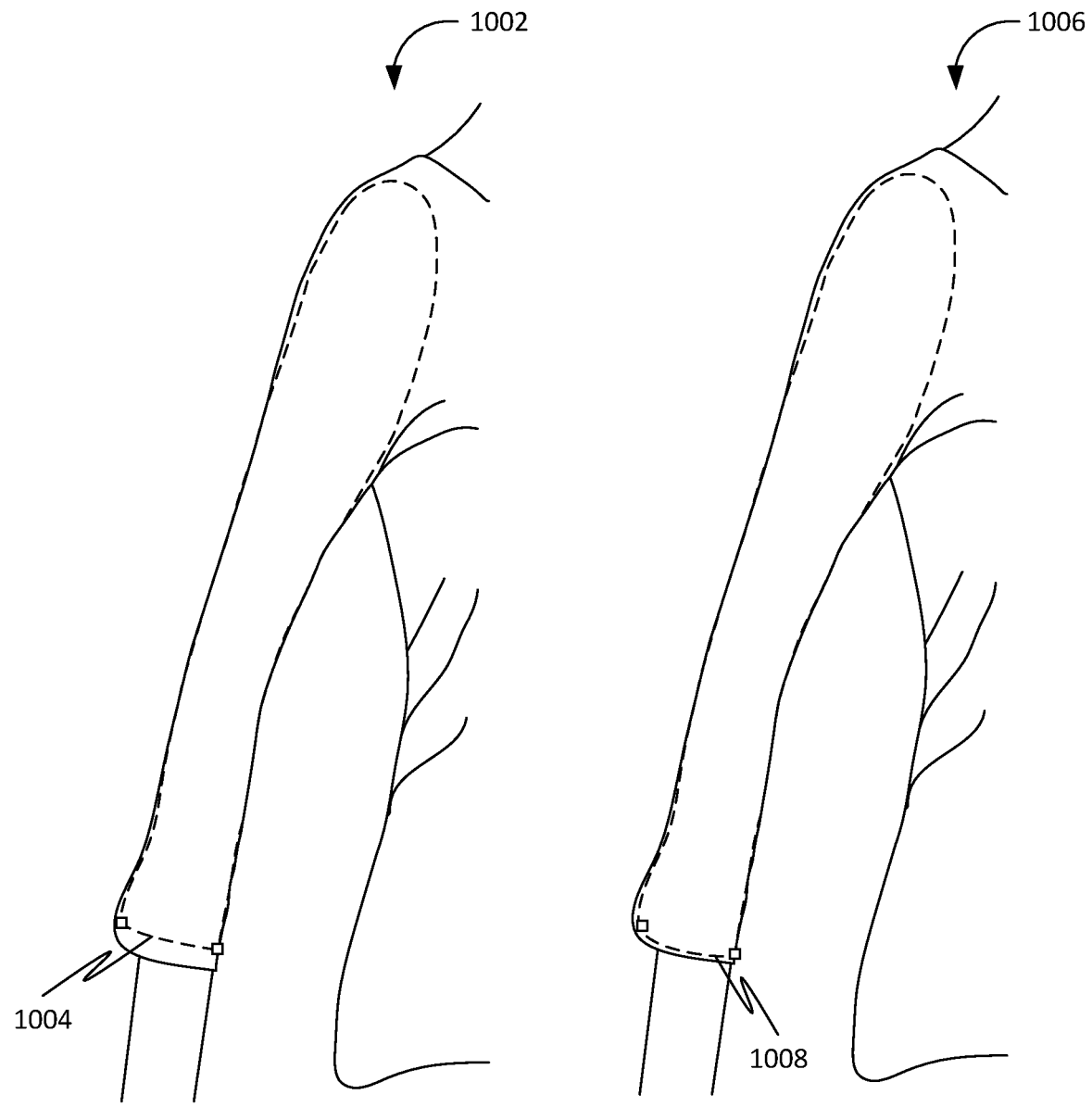
FIG. 10 is an illustration of a multi-stage control splines prediction obtained using the multi-stage algorithm in accordance with an exemplary embodiment.

In FIG. 10, there is shown an example illustration of a multi-stage control splines prediction obtained using the multi-stage algorithm in accordance with an exemplary embodiment. An output image 1002 may show a control spline prediction after stage 1 of the multi-stage algorithm (or the deep neural network prediction). The coarse-control spline is shown using a dotted line 1004. An output image 1006 may include a refined control spline after stage 2 of the multi-stage algorithm. The refined-control spline is shown using a dotted line 1008. The refined control spline may be obtained by adjusting the endpoint of the splines based on the silhouette of the garment layer. The output images 1002 and 1006 show automatically predicted control points and splines obtained using the trained deep neural networks.

Figure 11:
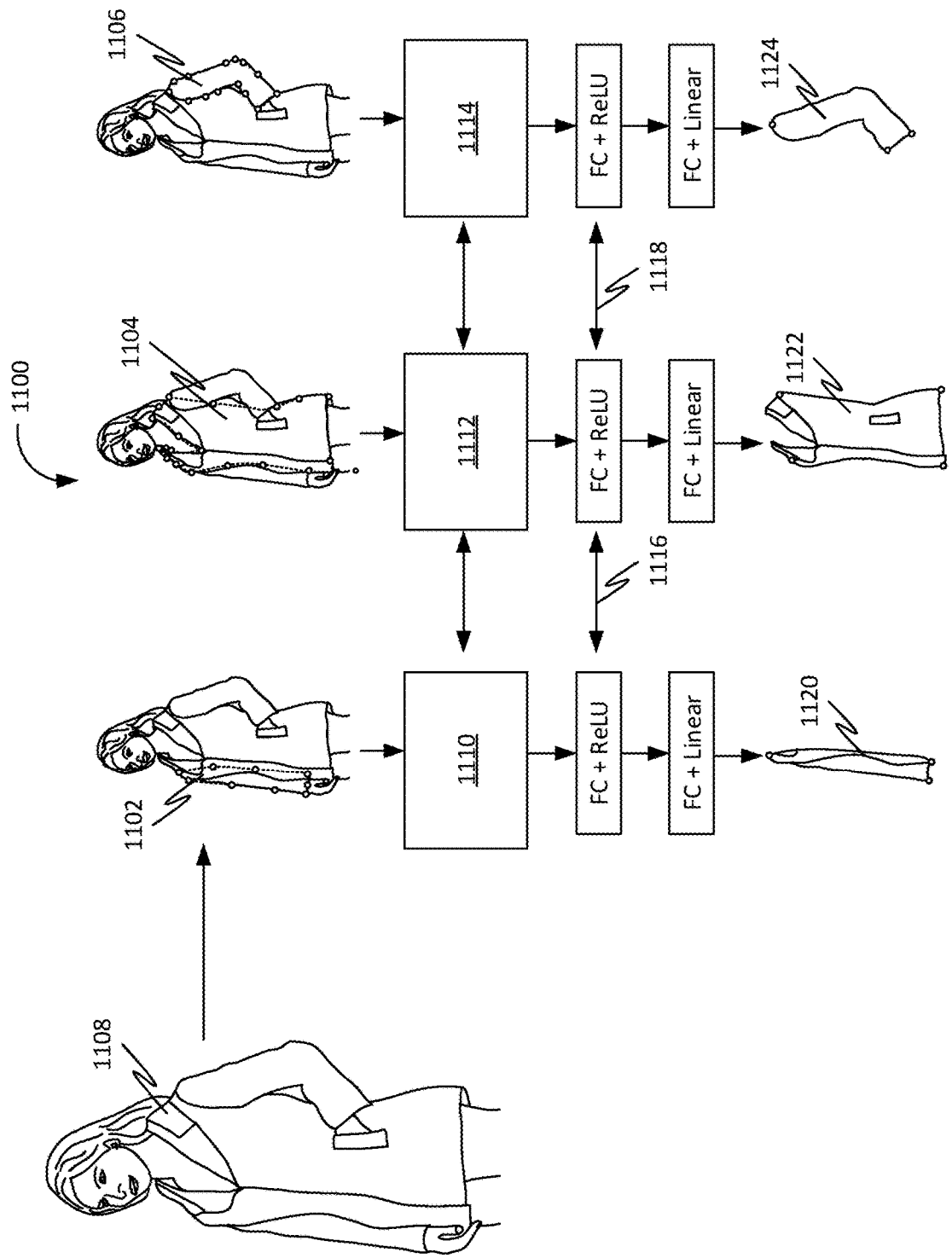
FIG. 11 is an illustration of a multi-tasking network for predicting garment landmarks and/or control splines end-points in multiple garment layers of a garment simultaneously in accordance with an exemplary embodiment.

In FIG. 11, there is shown an example illustration of a multi-tasking network 1100 for predicting garment landmarks and/or control splines endpoints in multiple garment layers of a garment simultaneously in accordance with an exemplary embodiment. The input of the network 1100 is the garment-layer texture sprites 1102-1106 corresponding to distinct body parts (the right sleeve, the torso and the left sleeve respectively). The garment-layer texture sprites 1102-1106 may be obtained after the segmentation and layer dividing on an input image 1108.

The multi-tasking network 1100 may include convolutional and pooling layers 1110-1114. The convolutional and pooling layers 1110-1114 may be implemented using classical network architecture (e.g. VGG11/16/19 [e.g. A. Krizhevsky, I. Sutskever, and G. E. Hinton: "Imagenet classification with deep convolutional neural networks". NIPS, 1(2):4, 2012] or GoogLeNet [e.g. C. Szegedy, W. Liu, Y. Jia, P. Sermanet, S. Reed, D. Anguelov, D. Erhan, V. Vanhoucke, and A. Rabinovich: "Going deeper with convolutions". In Proceedings of the IEEE Conference on Computer Vision and Pattern Recognition, pages 1-9, 2015]). Furthermore, the multi-tasking network 1100 may use weight sharing 1116-1118 to learn shared feature representation. Furthermore, the multi-tasking network 1100 may be trained to predict the garment landmarks and endpoints of control points on different garment layers and camera views simultaneously.

The multi-tasking network 1100 may provide outputs 1120-1124 which may include the visibility labels and positions of multiple control points on each defined garment layer.

The model body pose prediction module 110 may be configured to perform a body pose detection from an input model image used for garment digitisation. The model body pose prediction module 110 may return metadata information including, but not limited to, 2D/3D body joint positions, body joint visibility/occlusion information in the camera view of the image and 2D/3D skeleton layouts. The model body pose prediction module 110 may be implemented using deep neural networks and/or other computer vision approaches (e.g. OpenPose [e.g. Z. Cao and T. Simon and S. Wei and Y. Sheikh: "*Realtime Multi-Person 2D Pose Estimation using Part Affinity Fields*". In Proceedings of the IEEE Conference on Computer Vision and Pattern Recognition, 2017]).

Figure 12:
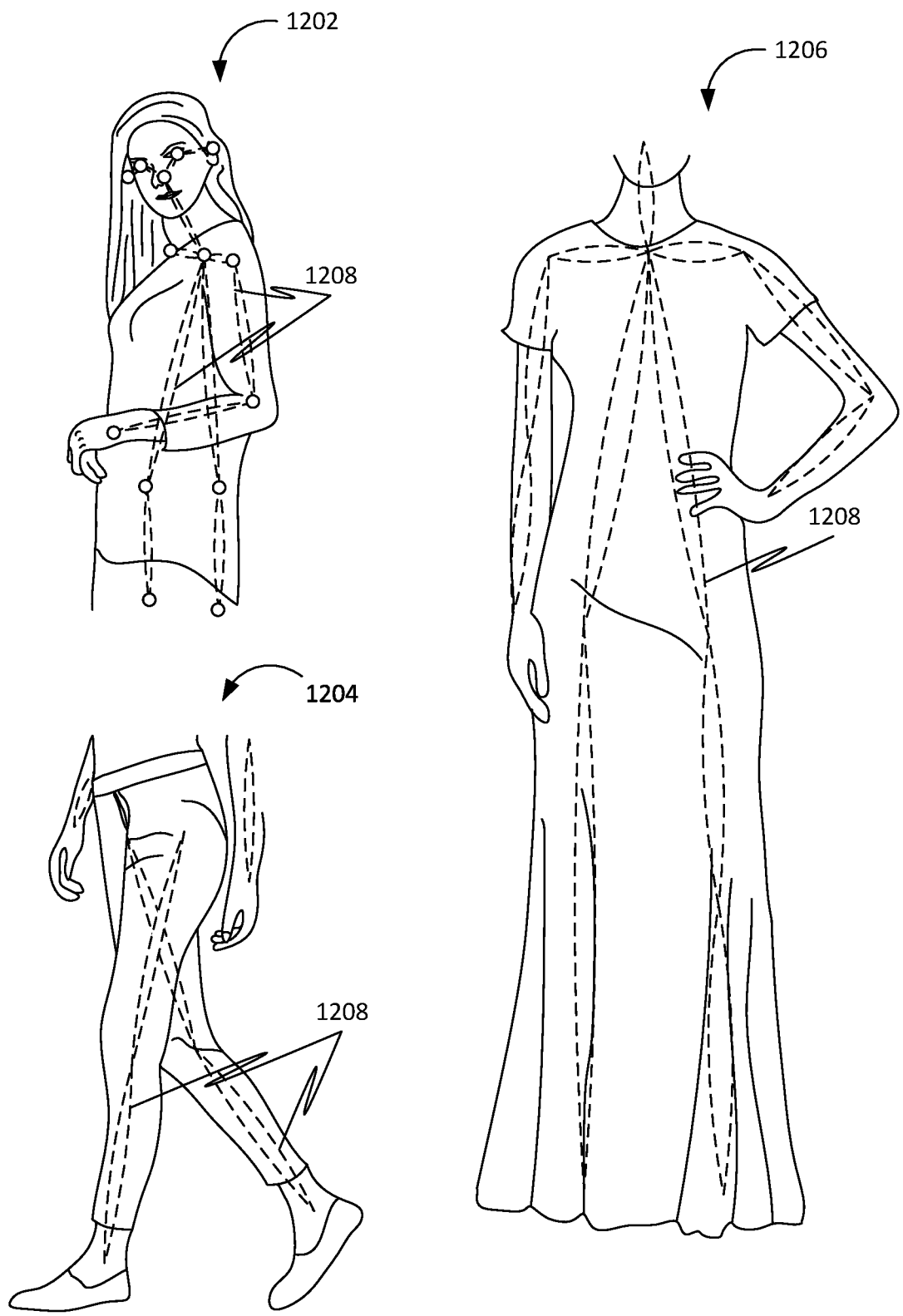
FIG. 12 is an illustration of output images obtained from a model body pose prediction module in accordance with an exemplary embodiment.

In FIG. 12, there is shown an example illustration of output images 1202-1206 obtained from the model body pose prediction module 110 in accordance with an exemplary embodiment. The output images 1202-1206 may correspond to 2D body pose prediction on input product photos using OpenPose [e.g. Z. Cao and T. Simon and S. Wei and Y. Sheikh: "*Realtime Multi-Person 2D Pose Estimation using Part Affinity Fields*". In Proceedings of the IEEE Conference on Computer Vision and Pattern Recognition, 2017]). The output images 1202-1206 may show the 2D skeleton layouts 1208 corresponding to the models in the input product photos.

Figure 13:
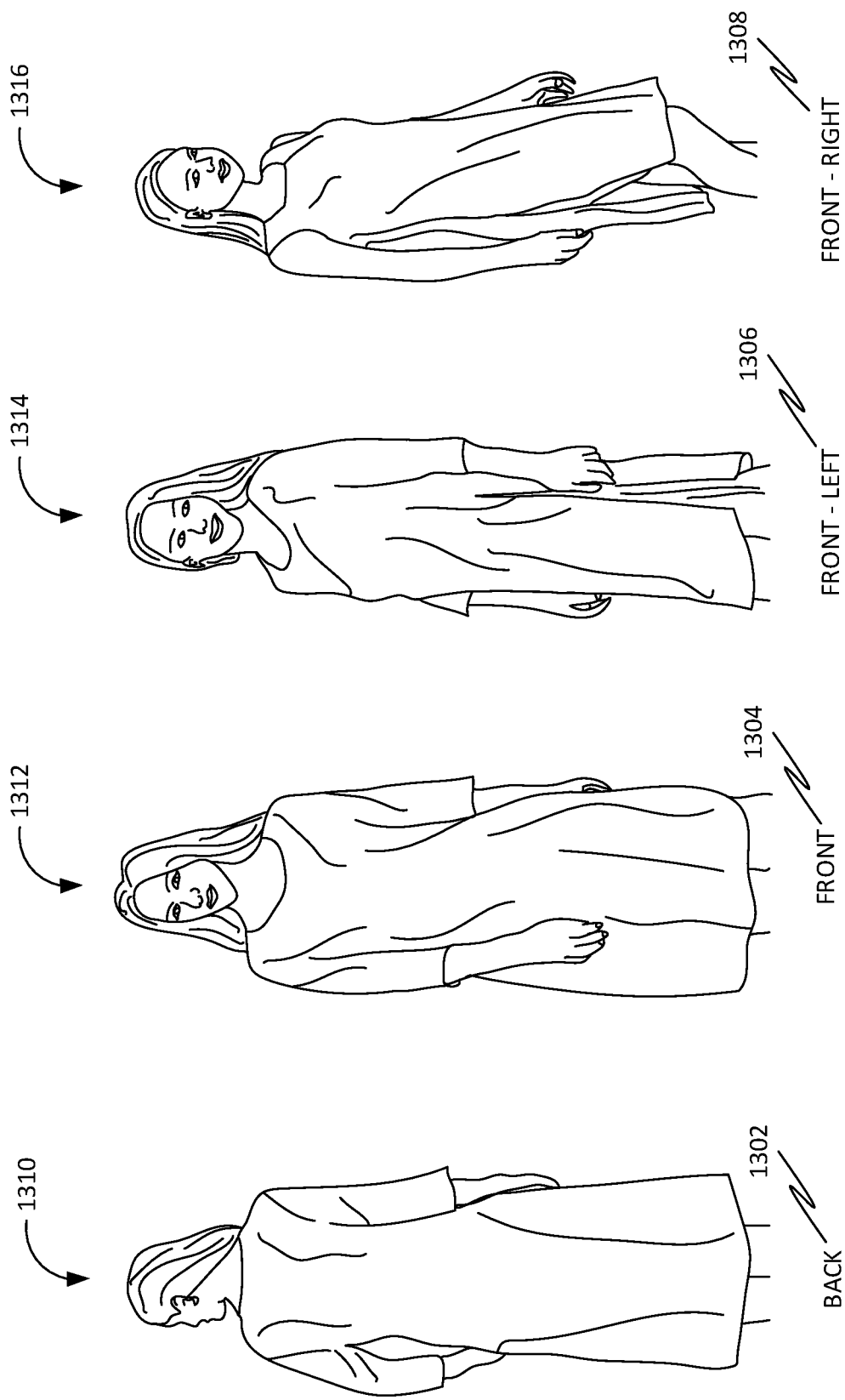
FIG. 13 is an illustration of output labels obtained from a camera view classification module for input images respectively, in accordance with an exemplary embodiment.

The camera view classification module 112 may be configured to classify the input image to a discrete set of approximate camera view angles with labels e.g. "Front", "Back", "Front left", etc. The camera view classification module 112 may be implemented using a machine learning classifier (e.g. random forests [e.g. J. Shotton, M. Johnson, R. Cipolla: "*Semantic Texton Forests for Image Categorization and Segmentation*" in Proceedings of the IEEE Conference on Computer Vision and Pattern Recognition, Jun. 1, 2008], or standard deep neural networks for classification [e.g. C. Szegedy, W. Liu, Y. Jia, P. Sermanet, S. Reed, D. Anguelov, D. Erhan, V. Vanhoucke, and A. Rabinovich: "*Going deeper with convolutions*". In Proceedings of the IEEE Conference on Computer Vision and Pattern Recognition, pages 1-9, 2015], [A. Krizhevsky, I. Sutskever, and G. E. Hinton: "*Imagenet classification with deep convolutional neural networks*". NIPS, 1(2):4, 2012] which may be trained on a number of labelled model image data of different camera views. In FIG. 13, there is shown an illustration of output labels 1302-1308 obtained from the camera view classification module 112 for input images 1310-1316 respectively, in accordance with an exemplary embodiment.

The body pose matching and pose changing module 114 may be configured to detect the underlying body pose in an input image and adjust the pose of a 3D virtual body model to match that in the input image. Accordingly, the body pose matching and pose changing module 114 may first create a pool (the body pose pool 124) of generated model images {Is}, by projecting a standard-shape virtual avatar 126 of a number of distinct representative body poses which are typically used in fashion photography, in different camera views. Then, the body pose matching and pose changing module 114 may precompute the corresponding body joint positions, skeleton layout, and joint visibility for each model pose image (Is) in the pool offline. This may be done either manually or automatically using a computer-vision-based 2D body pose detector e.g. OpenPose [e.g. Z. Cao and T. Simon and S. Wei and Y. Sheikh: "*Realtime Multi-Person 2D Pose Estimation using Part Affinity Fields*". In Proceedings of the IEEE Conference on Computer Vision and Pattern Recognition, 2017].

Thereafter, the body pose matching and pose changing module 114 may detect the body joint positions, skeleton layout and joint visibility in the input query model image (Iq) used for garment digitisation.

Moreover, the body pose matching and pose changing module 114 may find the most similar model pose image ($I_s^*$) defined in the body pose pool 124, by comparing the extracted 2D joints positions, skeleton layouts, joint visibility, etc. with each candidate pose image ($I_s$) in the pool 124 with a similarity metric. For example, an inner-product similarity over all the bones may be defined using equation 3 below.

$$\sum_{(i,j) \in S} v_{i,j}(q_i - q_j) \cdot (c_i - c_j), \tag{3}$$

wherein, each index pair (i, j) defines a bone in the common skeleton system S defined; $v_{i,j}$ are the binary visibility labels of the bone (i, j), which is defined as 0 if the bone is detected to be occluded in the query image $I_q$ and 1 if visible; $q_i$ and $q_j$ are the 2D positions of the starting and ending joints of the bone (i,j) in the query image $I_q$, and $c_i$ and $c_j$ are the 2D positions of the starting and ending joints of the bone (i,j) in the candidate pose image ($I_s$).

Furthermore, the body pose matching and pose changing module 114 may use the underlying body pose and camera view of the most similar model pose image ($I_s^*$) as the digitisation and rendering pose of the standard virtual avatar for the garment model in the specified viewpoint. As an alternative, the body pose of the avatar for each camera view in a visualization can be specified by the selected body pose used for garment digitisation which is estimated by the body pose matching and pose changing module 114 and stored in the garment database 120. By doing this, we can minimize the garment texture distortion in the specified camera view.

Figure 14:
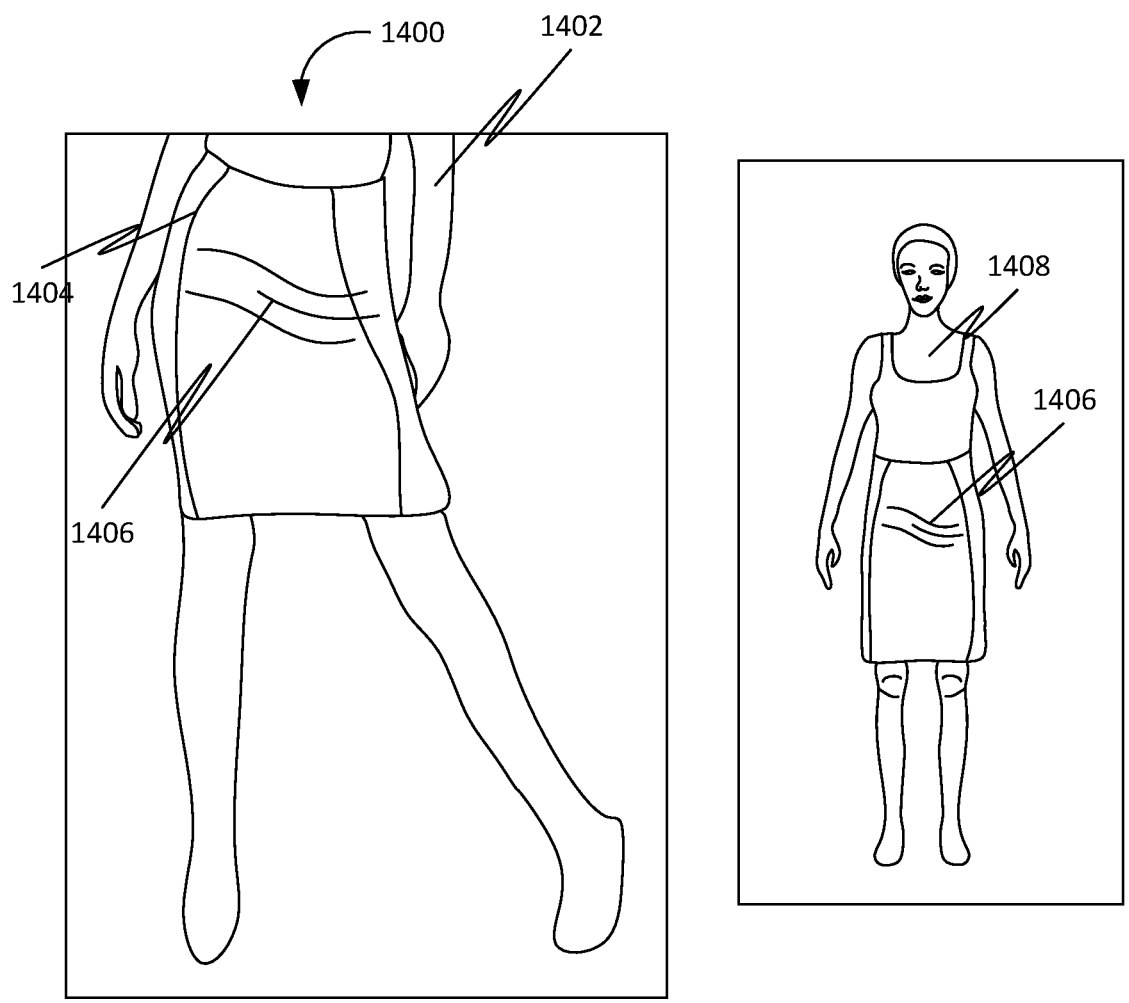
FIG. 14 is an illustration of an example of rendering artifacts due to pose mismatch in accordance with an exemplary embodiment.

The body pose matching and pose changing module 114 may, in an example, be essential to maintain the photorealism in the synthesized virtual try-on visualisation. For example, if in the input image there is a stretch-caused garment crease generated under the certain model pose in the input image, such a crease will look visually sensible only when the rendered body avatar is in a similar pose. If the pose of the avatar is different than the pose of the model in the input image, then the stretch-caused garment crease may cause a mismatch. In FIG. 14, there is shown an example illustration of an input image 1400 with a model 1402 wearing a garment 1404 (a skirt) and standing in a first pose. Due to the first pose, a stretch-caused garment crease 1406 is created in the garment 1404. An avatar 1408 may be standing in a second pose different from the first pose. The avatar 1408 may be wearing the same garment 1404. However, due to pose mismatch, the crease 1406 looks out of place in the garment 1404 worn by the avatar 1408.

Figure 15:
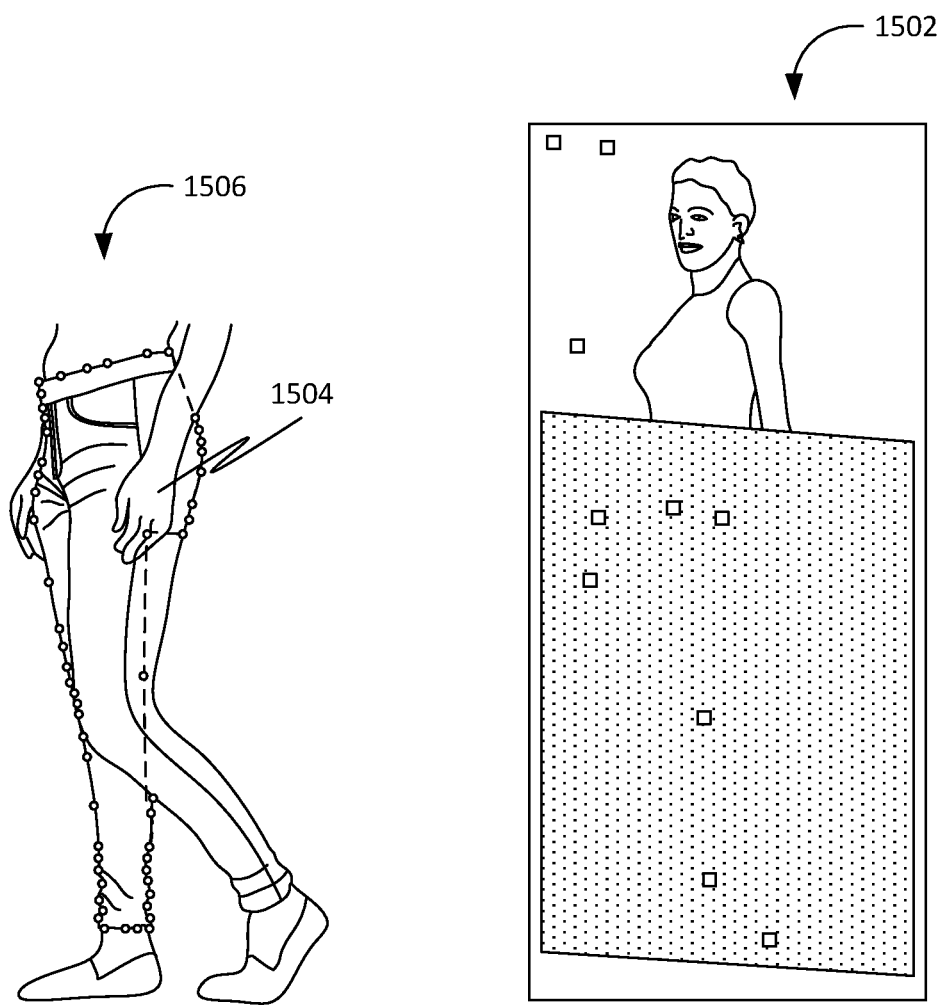
FIG. 15 is an illustration of an automatic garment texture alignment and sprite scale estimation in accordance with an exemplary embodiment.

The garment sprite alignment module 116 may be configured to create a 2D thin-plate splines (TPS) warp field that may apply a spatial transformation on the cut-out garment texture sprites so that it may be laid on the proper positions on the standard body avatar used for garment digitisation. Therefore, source-sink control points pairs of the TPS model may be automatically generated based on the relevant set of corresponding joint positions of the input image and digitisation model images. Further, the scale of the sprites may also be automatically adjusted by computing the average scaling ratio of the relevant bone lengths. In FIG. 15, there is shown an example illustration of an automatic garment texture alignment and sprite scale estimation in accordance with an exemplary embodiment. As shown, the pose of an avatar 1502 may be matched with the pose of a model 1504 in an input image 1506.

Furthermore, the garment geometry and physics reconstruction module 118 may be configured to apply a 2.5 D multi-view garment physics simulation on the multi-projections of the 3D body avatar model [e.g. T. Adeyoola, N. Brown, N. Trott, E. Herbert, D. Robertson, J. Downing, N. Day, R. Boland, T. Boucher, J. Townsend, E. Clay, T. Warren, and A. Unadkat: "*Computer implemented methods and systems for generating virtual body models for garment fit visualisation*". UK Patent GB2488237, Metail Limited, August 2012.].

Finally, a digital garment model 128 may be obtained. Furthermore, the digital garment model 128 may include garment geometry data 130, garment appearance data 132 and garment metadata 134. The garment geometry data 130 may include, but is not limited to, 2D silhouette(s) and 3D mesh model(s). The garment appearance data 132 may include, but is not limited, to cut-out garment texture sprites, texture maps for 3D mesh generated by back-projecting and stitching the 2D texture from each view, and alpha maps capturing the translucency of the garment. The garment metadata 134 may include landmark points and control splines, which are useful for instructing physics simulation and layer composition in an outfit. Further, the garment metadata 134 may include garment attributes of style, colour, texture, shape, fit styles, vertical drapes (e.g. cuff, hem height, waist line position) material stretch and strain, etc.

Then, the digital garment model 128 may be stored in the garment database 120. The garment database 120 may be configured to store all the information of the garments being digitised. The information may include image data (such as unsegmented original garment images and segmented garment sprites in different pose and camera views) and metadata (including control points/splines positions, semantic labels, attributes, and other information about the garment).

The labelled garment image dataset 122 is a structured dataset containing a volume of garment image data and corresponding manually-generated semantic label map (indicating the regions of garment, skin, hair, background, etc.), attributes (including garment category, pattern, colour, material properties, camera view, etc.), control point/spline annotations (including garment landmark, body joints, skeleton layout, etc). The labelled garment image dataset 122 may be used as training data for learning machine learning models for garment segmentation, automatic landmark/control spline generation, body pose detection, camera view classification, etc.

Figure 16:
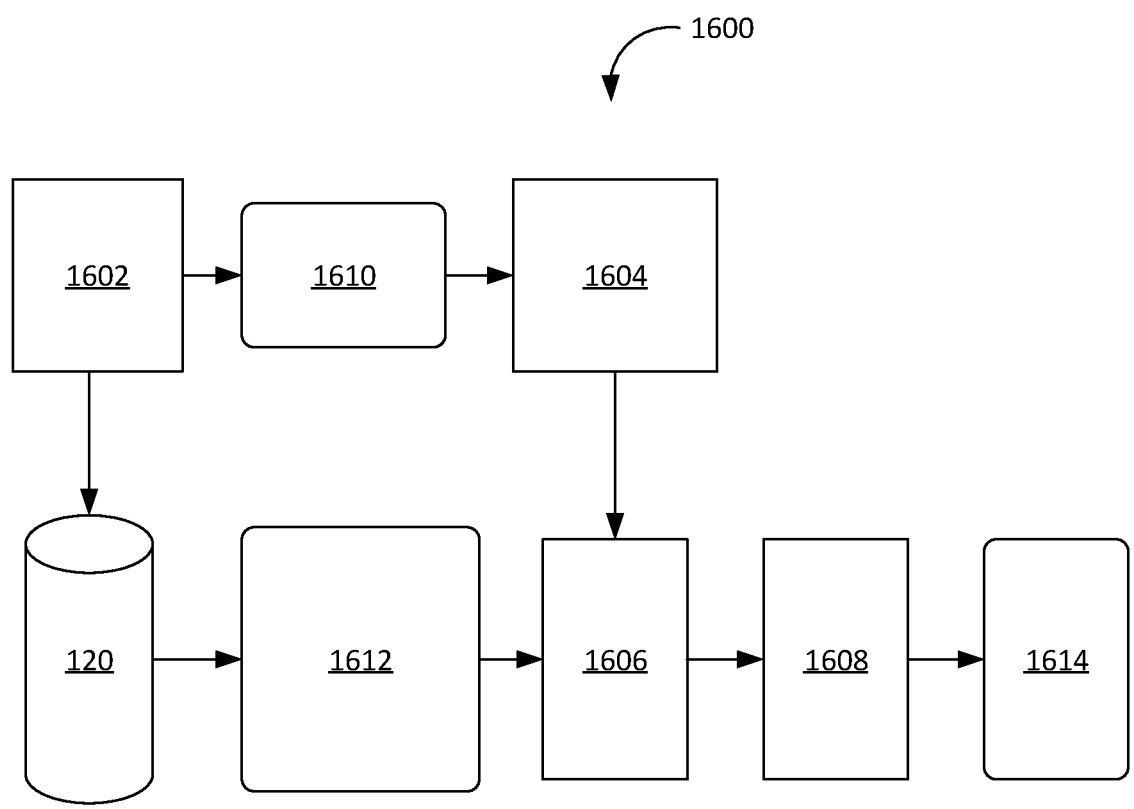
FIG. 16 is a block diagram of the second subsystem, in accordance with an embodiment of the present disclosure.

In FIG. 16, there is shown a block diagram of an example of the second subsystem 1600, in accordance with an embodiment of the present disclosure. The second subsystem 1600 may be a run-time simulation and visualization subsystem. Given the input of pre-digitised digital garment models stored in the garment database 120, the run-time simulation and visualization subsystem 1600 is responsible for creating a customer's 3D body model, loading stored digital garment models from the garment database 120, simulating digital garment models on a customer's 3D body model with specified shape and pose, compositing different digital garment models into an outfit, and finally rendering a dressed avatar of the customer for final visualization [e.g. T. Adeyoola, N. Brown, N. Trott, E. Herbert, D. Robertson, J. Downing, N. Day, R. Boland, T. Boucher, J. Townsend, E. Clay, T. Warren, and A. Unadkat: "*Computer implemented methods and systems for generating virtual body models for garment fit visualisation*". UK Patent GB2488237, Metail Limited, August 2012].

The second subsystem 1600 may include one or more of UI's for a virtual fitting room 1602, a body shape estimation module 1604, a garment physics simulation module 1606 and an outfitting and rendering module 1608. The UI's for a virtual fitting room 1602 may include UI's for a customer to provide their body metrics, measurements, and other input 1610 for generating a 3D body avatar representing their body shape and selecting preferred body pose [e.g. T. Adeyoola, N. Brown, N. Trott, E. Herbert, D. Robertson, J. Downing, N. Day, R. Boland, T. Boucher, J. Townsend, E. Clay, T. Warren, and A. Unadkat: "*Computer implemented methods and systems for generating virtual body models for garment fit visualisation*". UK Patent GB2488237, Metail Limited, August 2012]. Furthermore, the UI's for virtual fitting room 1602 may include UI's that allows a customer to select garments to be dressed onto the virtual avatar. When garments are selected, corresponding data may be sent to a cloth cutting machine to cut cloth elements for manufacturing the garments; stitching of the elements together for producing the garments is performed manually and/or by employing automated sewing apparatus.

The body shape estimation module 1604 may generate a full 3D geometry of a body avatar from body measurements and parameters provided by the customer in the UI (e.g. height, weight, cup size, bust circumference, waist circumference, hips circumference, inside leg length, etc.). The body shape estimation module 1604 may be implemented based on a 3D statistical body model with skeleton embedded and applying a regression to estimate intrinsic model parameters from input measurements for 3D reconstruction [e.g. T. Adeyoola, N. Brown, N. Trott, E. Herbert, D. Robertson, J. Downing, N. Day, R. Boland, T. Boucher, J. Townsend, E. Clay, T. Warren, and A. Unadkat: "*Computer implemented methods and systems for generating virtual body models for garment fit visualisation*". UK Patent GB2488237, Metail Limited, August 2012].

The garment database 120 may be configured to receive queries from the UI's of a virtual fitting room 1602 and returns one or more digital garment models 1612 comprising the texture, geometry, finite element representations, and other metadata.

The garment physics simulation module 1606 may be configured to perform finite-element analysis of the digital garment model(s) on the generated 3D body avatar of the customers. At the runtime, the garment physics simulation module 1606 models how the garment model will drape and fit against, or on, a customer body shape.

The outfitting and rendering module 1608 may be configured to composite multiple individual garment models in the correct layering order and then display the 3D body avatar of the customer in an outfit of one or more selected garments.

Finally, the output of the subsystem 1600 is a dressed body avatar(s) (in 2D/3D) visualization with the target garment 1614.

Figure 17:
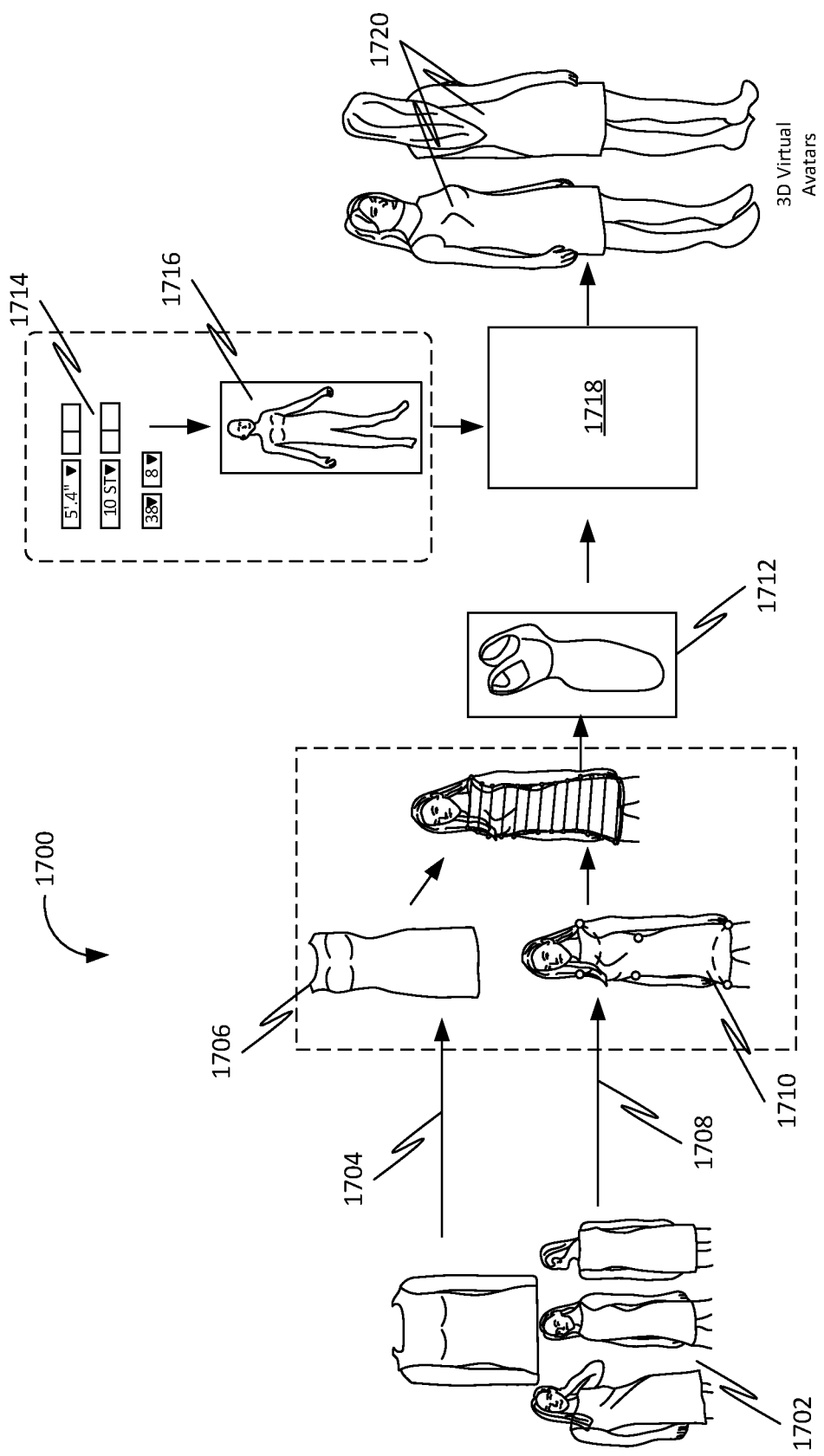
FIG. 17 is an illustration of a new garment digitisation and virtual try-on visualization process in accordance with some embodiments.

In FIG. 17, there is shown an example illustration of a new garment digitisation and virtual try-on visualization process 1700 in accordance with some embodiments. Firstly, product photos 1702 may be obtained; for example, the product photos may be obtained from a retailer's website. The product photos 1702 may include different poses of a model wearing a garment. The product photos 1702 may be obtained via the API's and UI's 102.

Thereafter, the product photos 1702 may undergo a segmentation and in-painting process 1704 to obtain texture cut-outs 1706. The segmentation may be performed by the garment cut-out and layer dividing module 106. Furthermore, the in-painting may be performed by the garment texture in-painting module 104.

Furthermore, the product photos 1702 may undergo a landmark and control spline localization process 1708 to obtain garment landmark and control splines 1710. The landmark and control spline localization process may be performed by the landmark and control spline prediction module 108.

Thereafter, a garment model 1712 may be generated. The model body pose prediction module 110, the camera view classification module 112, the body pose matching and pose changing module 114, the garment sprite alignment module 116, and the garment geometry and physics reconstruction module 118 may be used to generate the garment model 1712. The garment model 1712 may be stored in the garment database 120.

Thereafter, a customer may provide body measurement input 1714. The customer may provide the body measurement input using the UI's for a virtual fitting room 1602. Based on the input received from the customer, a 3D model 1716 of the customer (avatar) may be generated. The body shape estimation module 1604 may be used to generate the 3D model 1716.

Finally, the garment model 1712 may be fitted on the 3D model 1716 via a visualization engine 1718 to provide a final output 1720. The visualization engine 1718 may include the garment physics simulation module 1606 and the outfitting and rendering module 1608.

Figure 18:
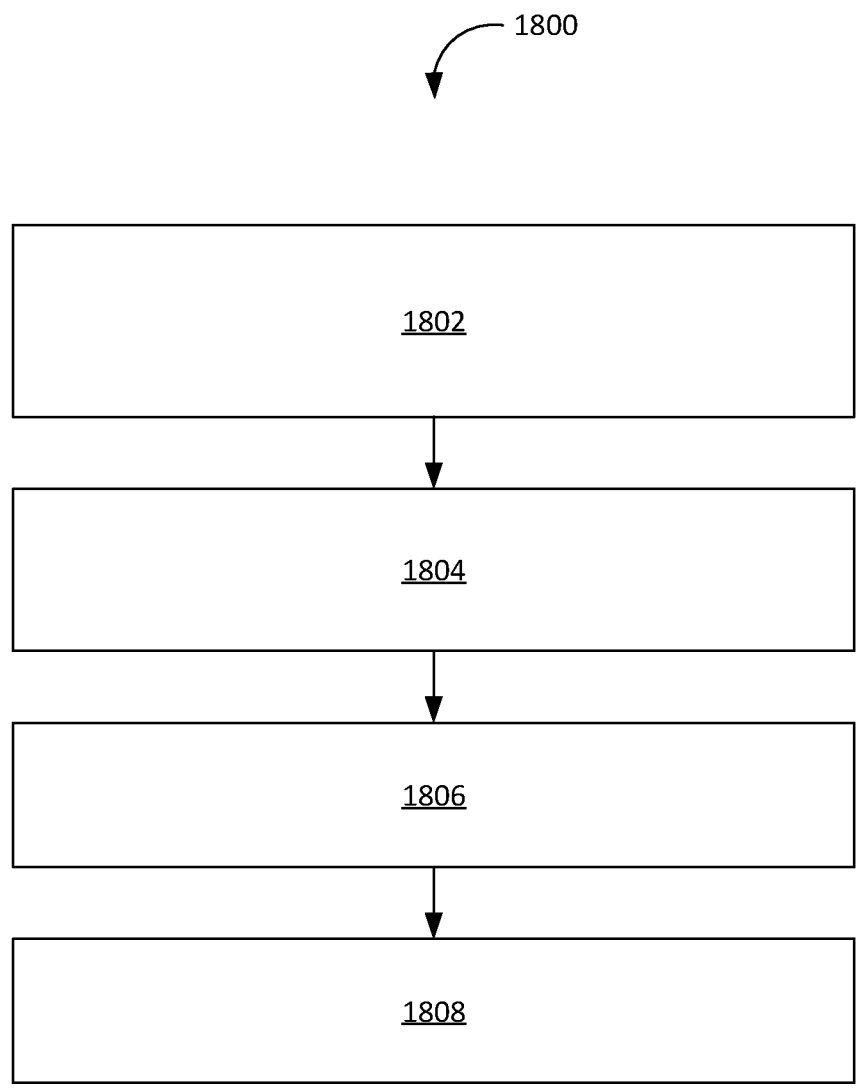
FIG. 18 is a flowchart of a method for producing a garment via use of an interactive garment model created from one or more two dimensional images in accordance with some embodiments.

In FIG. 18, there is shown a flowchart of an example method 1800 of producing a garment via use of an interactive garment model created from one or more two dimensional images, in accordance with some embodiments. At a step 1802, the method 1800 includes using a data processing arrangement of the production system to execute one or more software products to create an interactive environment for hosting the interactive garment model. Further, at a step 1804, the method 1800 includes arranging for the two dimensional images to comprise at least a garment, a model wearing the garment and a background. Yet further, at a step 1806, the method 1800 includes using the production system to acquire the one or more two dimensional images of a garment from one or more viewing angles. Moreover, at a step 1808, the method 1800 includes using the production system to create a three dimensional model of the garment.

An "image file" may refer to one or more photos of garments, to computer created garment drawings (CAD), or to garment videos, for example. A "garment" could be an item of clothing or an accessory such as a hat or shoes, for example.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A computer-implemented method of generating an image file of a 3D body model of a user wearing a garment, the method comprising the computer-implemented steps of:
   (i) receiving one or more two dimensional images of a model wearing a garment, wherein in at least one two dimensional image the model is in an occluded pose, wherein the one or more two dimensional images of the model wearing the garment provide a view of an outer surface of the garment;
   (ii) for each two dimensional image, segmenting an image of the garment to produce a set of segmented garment images;
   (iii) using the set of segmented garment images to generate a complete 3D garment model;
   (iv) receiving a 3D body model of a user;
   (v) simulating the complete 3D garment model worn on the 3D body model of the user and,
   (vi) generating an image file of the 3D body model of the user wearing the complete 3D garment model, using the simulated complete 3D garment model worn on the 3D body model of the user.

2. The method of claim 1, wherein the view of an outer surface of the garment is an incomplete view of an outer surface of the garment, and wherein step (iii) includes filling-in a 3D garment model to generate the complete 3D garment model.

3. The method of claim 1, the method including: deriving a set of texture samples of the garment from the set of segmented garment images; using the set of segmented garment images to generate an incomplete 3D garment model; filling-in the incomplete 3D garment model to generate a complete 3D garment model, including filling-in a texture of the complete 3D garment model using the texture samples, to create a coherent texture of the complete 3D garment model, the complete 3D garment model including the coherent texture of the complete 3D garment model.

4. The method of claim 1, in which any occluded sections of the garment within the one or more two dimensional images of the model wearing the garment are identified and recreated automatically to produce a non-occluded 3D garment model.

5. The method of claim 1, in which at least one of a patch based algorithm, and a diffusion based algorithm, is used.

6. The method of claim 1, including predicting automatically a visibility of and locations of one or more garment landmarks and/or splines on the model within an image.

7. The method of claim 1, including acquiring a plurality of model images of the model where one or a plurality of viewing angles and one or a plurality of body poses, are used.

8. The method of claim 1, including using a deep neural network model for generating the 3D garment model, or for generating the complete 3D garment model.

9. The method of claim 1, including acquiring the one or more two dimensional images of the model wearing the garment from at least one of: an internet web site, a digital camera device, a computer aided design, a streaming data feed.

10. The method of claim 1, including using a data processing arrangement comprising a first subsystem which creates a digital garment model of a garment from 2D images of the garment, and a second subsystem which simulates the digital garment model onto a 3D body avatar of a consumer.

11. The method of claim 10, including using the data processing arrangement to receive inputs from the user, wherein the inputs include one or more consumer body metrics, and using the second subsystem to generate automatically a 3D body avatar representing the consumer's body shape.

12. The method of claim 10, including using the second subsystem to create the 3D body avatar representing the user's body shape using a 3D statistical body model with an embedded skeleton and a regression application.

13. The method of claim 10, including using the data processing system to receive inputs from the user to define a preferred body pose, and to configure the second subsystem to create automatically an identical body pose for the 3D body avatar.

14. The method of claim 10, including using the second subsystem to select automatically one or more digital garment models from a garment database which match a consumer's garment choice input.

15. The method of claim 14, including using the second subsystem to simulate automatically a drape and a fit of the digital garment model onto the 3D body avatar.

16. The method of claim 15, including using the second subsystem to simulate the drape and the fit of the digital garment model onto the 3D body avatar using finite-element analysis.

17. The method of claim 15, including using the second subsystem to composite automatically multiple individual garment models in a correct layering order and then to display the 3D body avatar in an outfit of one or more selected garments.

18. The method of claim 10, including the step of the first subsystem recognizing body poses in the one or more two dimensional images of the model wearing the garment, and automatically matching a nearest pose in a pre-defined pose pool and selecting appropriate body poses for digitization.

19. The method of claim 1, in which for each two dimensional image, the segmenting of an image of the garment to produce a segmented garment image is performed automatically.

20. A system arranged to generate an image file of a 3D body model of a user wearing a garment, the system including a processor configured to:

(i) receive one or more two dimensional images of a model wearing a garment, wherein in at least one two dimensional image the model is in an occluded pose, wherein the one or more two dimensional images of the model wearing the garment provide a view of an outer surface of the garment;
(ii) for each two dimensional image, segment an image of the garment to produce a set of segmented garment images;
(iii) use the set of segmented garment images to generate a complete 3D garment model;
(iv) receive a 3D body model of a user;
(v) simulate the complete 3D garment model being worn on the 3D body model of the user and,
(vi) generate an image file of the 3D body model of the user wearing the complete 3D garment model, using the simulated complete 3D garment model being worn on the 3D body model of the user.

21. A computer program product, executable on a processor to perform a method of generating an image file of a 3D body model of a user wearing a garment, the computer program product executable on the processor to:

(i) receive one or more two dimensional images of a model wearing a garment, wherein in at least one two dimensional image the model is in an occluded pose, wherein the one or more two dimensional images of the model wearing the garment provide a view of an outer surface of the garment;
(ii) for each two dimensional image, segment an image of the garment to produce a set of segmented garment images;
(iii) use the set of segmented garment images to generate a complete 3D garment model;
(iv) receive a 3D body model of a user;
(v) simulate the complete 3D garment model worn on the 3D body model of the user and,
(vi) generate an image file of the 3D body model of the user wearing the complete 3D garment model, using the simulated complete 3D garment model worn on the 3D body model of the user.

* * * * *